United States Patent
Funato et al.

(10) Patent No.: US 7,164,532 B2
(45) Date of Patent: Jan. 16, 2007

(54) DIFFRACTION GRATING, LIGHT SOURCE UNIT APPLYING THE SAME THEREIN, AND OPTICAL HEAD DEVICE EMPLOYING THE SAME

(75) Inventors: Hiroyoshi Funato, Kanagawa (JP); Junichi Kitabayashi, Kanagawa (JP); Shigeru Oohchida, Tokyo (JP); Tsuyoshi Suzudo, Miyagi (JP)

(73) Assignee: Ricoh Company, Ltd., Tokyo (JP)

(*) Notice: Subject to any disclaimer, the term of this patent is extended or adjusted under 35 U.S.C. 154(b) by 540 days.

(21) Appl. No.: 10/414,047

(22) Filed: Apr. 16, 2003

(65) Prior Publication Data

US 2004/0013076 A1 Jan. 22, 2004

(30) Foreign Application Priority Data

| Apr. 19, 2002 | (JP) | 2002-117861 |
| Apr. 19, 2002 | (JP) | 2002-118445 |
| Jun. 12, 2002 | (JP) | 2002-171427 |
| Aug. 26, 2002 | (JP) | 2002-245199 |

(51) Int. Cl.
*G02B 5/18* (2006.01)

(52) U.S. Cl. .......... 359/569; 359/566; 359/574; 359/494; 369/112.03

(58) Field of Classification Search ........ 359/566–576, 359/494; 369/112.03–112.08, 112.12, 112.16
See application file for complete search history.

(56) References Cited

U.S. PATENT DOCUMENTS

| 5,116,461 A * | 5/1992 | Lebby et al. ............... 216/2 |
| 5,325,348 A | 6/1994 | Maeda et al. |
| 5,333,231 A | 7/1994 | Fukuda et al. |
| 5,402,154 A | 3/1995 | Shibaguchi et al. |
| 5,428,588 A | 6/1995 | Ohuchida |
| 5,481,636 A | 1/1996 | Fukuda et al. |
| 5,487,058 A | 1/1996 | Kitabayashi |
| 5,684,779 A | 11/1997 | Ohuchida et al. |
| 5,956,302 A | 9/1999 | Maeda et al. |
| 6,026,101 A | 2/2000 | Suzudo et al. |
| 6,072,579 A | 6/2000 | Funato |
| 6,111,900 A | 8/2000 | Suzudo |
| 6,584,060 B1 | 6/2003 | Oohchida et al. |
| 6,618,344 B1 | 9/2003 | Funato |
| 6,822,796 B1 * | 11/2004 | Takada et al. ............... 359/569 |
| 2001/0026523 A1 | 10/2001 | Ohuchida et al. |
| 2002/0018432 A1 | 2/2002 | Ohuchida |
| 2002/0093902 A1 | 7/2002 | Hirai et al. |
| 2003/0072047 A1 | 4/2003 | Funato et al. |

FOREIGN PATENT DOCUMENTS

| JP | 9-50642 | 2/1997 |
| JP | 9-63111 | 3/1997 |
| JP | 2000-75130 | 3/2000 |
| JP | 2000-221325 | 8/2000 |

* cited by examiner

*Primary Examiner*—Leonidas Boutsikaris
(74) *Attorney, Agent, or Firm*—Dickstein Shapiro LLP

(57) ABSTRACT

A polarization diffraction grating includes two media having different orientation states arranged alternately and cyclically, wherein each boundary between the media forms an oblique rectangular shape.

15 Claims, 12 Drawing Sheets

DIFFRACTION GRATING, LIGHT SOURCE UNIT APPLYING THE SAME THEREIN, AND OPTICAL HEAD DEVICE EMPLOYING THE SAME

BACKGROUND OF THE INVENTION

1. Field of the Invention

The present invention relates to an optical head device in an optical disk drive which can carry out recording/reproduction of information into/from an optical recording media (optical disks) in a plurality of standards having different operation wavelengths, i.e., at least some of CDs (compact disks), DVDs (digital versatile disks), S-DVDs, disks applicable for a blue operation wavelength and so forth, with an employment of a polarization diffraction grating or a polarization hologram device for a beam splitting purpose therein.

2. Description of the Related Art

An optical system which splits a beam with a diffraction device and applies a reflected light from an optical disk which is an optical information recording medium onto a light detection device is provided in an optical head device (optical pickup) of an optical disk drive in various types. As the above-mentioned diffraction device, a polarization diffraction device is known, for example.

For example, a usage of such a diffraction device which has an optical anisotropy formed of an optical anisotropic polymer as a diffraction device in an optical head device which performs recording/reading of information by applying a beam from a light source through the diffraction device onto an optical recording medium is disclosed by Japanese laid-open patent application No. 9-50642, entitled "Optical Head Device and Its Manufacture Method", for example.

Such an example of a conventional diffraction device is shown in FIG. 1. A medium 102 showing a birefringence (optical anisotropy) with a rectangular patterned indented surface 102a formed on a transparent substrate 101 is arranged. Thereon, a medium 103 having an optical isotropy is applied, and, after that, a transparent substrate 101' is put thereon. Thus, a polarization diffraction grating 107 is produced. Therein, a diffraction grating which shows a polarization property (optical anisotropy) is obtained by making the refractive index of the isotropic medium 103 equal either to an ordinary-ray refractive index or an extraordinary-ray refractive index of the birefringent medium 102. Thereby, the characteristics can be provided therein in that approximately all the beams having a certain polarization direction is transmitted thereby while approximately all the beams having a polarization direction perpendicular thereto is diffracted thereby.

When such a polarization diffraction grating 107 is used as a beam splitting device in an optical head device of an optical disk drive, a setting is made such that a going beam directed toward an optical recording medium or an optical disk from a light source is completely transmitted by the polarization diffraction grating 107 so that the beam is efficiently applied to the optical recording medium. After that, a reflected beam from the optical recording medium is returned to the polarization diffraction grating 107 after the polarization direction is made perpendicular through a ¼-wavelength plate disposed in the beam path so that the returning beam is completely diffracted by the polarization grating 107 into a light detection device with high light-usage efficiency. Thus, it becomes possible to realize an efficient optical head device in which the light-usage efficiency is high either on the going beam or on the returning beam.

In case the above polarization diffraction grating is disposed nearer to the light source part so as to miniaturize a space needed around the light source and light detecting device, it is necessary to make the pitch in the polarization diffraction grating smaller as possible so as to increase the diffraction angle on the returning beam.

However, when the pitch is made smaller, one problem may occur. This is a problem concerning an angle-dependency of the diffraction efficiency. FIG. 2 shows a relation between the incidence angle onto the polarization diffraction grating and the +1-th diffraction efficiency. In FIG. 2, a curve 201 shows the characteristic of a grating with a comparatively large grating pitch (more than 4 micrometers). When the grating pitch is thus relatively greater, it acts as a thin-plane-type diffraction grating, the 1-th incidence-angle-dependent diffraction efficiency has a quite flat characteristic as shown, the diffraction efficiency is approximately 40% and the diffraction efficiency hardly changes with a change in the incidence angle.

On the other hand, the characteristic when the grating pitch is relatively small is shown as a curve 202. The curve 202 shows the incidence-angle-dependent +1-th diffraction efficiency characteristic in case the grating pitch is set as 1.6 micrometers. As shown, when the grating pitch is made smaller, the grating type thereof changes from a thin plane-type diffraction grating into a thick volume-type diffraction grating. The characteristic in this case is such that the diffraction efficiency at a specific incidence angle θB has a peak with respect to the diffraction efficiency at 0 degree of incidence angles as shown.

A Q value of a diffraction grating is defined as a criterion for distinguishing the above-mentioned thin grating and thick grating. Where the operation wavelength is λ, the grating thickness is T, the grating average refractive index is 'n', and the grating pitch is 'd', the Q value of the diffraction grating is expressed by the following formula:

$$Q=2\pi\lambda T/nd^2$$

Then, for example, upon Q<1, it is distinguished as a thin plane-type grating, while, upon Q>10, it is distinguished as a thick volume-type grating. Upon 1<Q<10, it is distinguished as a grating in an intermediate range between a plane type and a volume type.

In the example shown in FIG. 2, assuming that the operation wavelength λ=0.66 micrometers, Q=0.64 and it is distinguished as a plane-type grating for the curve 201, while for the curve 202, Q=4.0 is obtained, thus, it somewhat shows the characteristic of a volume-type grating, and it is distinguished as a grating in an intermediate range between a plane-type grating and a volume-type grating. That is, the diffraction efficiency has a peak for a specific incidence angle θB as mentioned above. This specific incidence angle θB is called a Bragg angle, and it is expressed as follows:

$$\theta B=\sin^{-1}(\lambda/2d)$$

As the grating pitch is 1.6 micrometers in the case of the curve 202 of FIG. 2, θB=11.9 degrees is obtained assuming that the operation wavelength of λ=0.66 micrometers. That is, the diffraction efficiency is highest when the incidence angle is 11.9 degrees in the air, and, thus, higher than that in the case of right-angle or perpendicular incidence. In case of the curve 202 of FIG. 2, a maximum of 70% or more of diffraction efficiency is obtained there.

When the pitch of the diffraction grating is made smaller and thus the polarization diffraction grating having the characteristic of the above-mentioned volume-type grating is used in an optical head device so as to dispose the polarization diffraction grating nearer to a light source part and thus miniaturize an optical system needed around the light source and an light detection device, a problem may arise.

The problem will now be discussed with reference to a case of applying the polarization diffraction grating which has the pitch made smaller into an optical head device with a configuration shown in FIG. 3. As shown, the optical head device includes a light source 108 is made of a semiconductor laser, or so, a light detection device 107 including a light-receiving-surface-divided photodiode, a ¼-wavelength plate 111, a collimator lens 110, a polarization diffraction grating 107, and an object lens 112 for focusing an incident beam onto an optical recording medium 113.

A beam emitted from the light source 108 is previously set such that it is approximately completely transmitted by the polarization diffraction grating 107. Then, after being collimated by the collimator lens 110, the beam turns into a circle polarization with the ¼-wavelength plate 111, and it is focused onto the optical recording medium 113 with the object lens 112. The reflected light from the optical recording medium 113 is then transformed in its polarization direction such that it intersects perpendicularly with that in the going beam through the ¼-wavelength plate 111, turns into a convergence beam by the collimator lens 110, and thus, is applied to the polarization diffraction grating 107.

Since this beam has the polarization which intersects perpendicularly to that in the going beam as mentioned above, this beam is approximately completely diffracted thereby, thus a +1-th diffracted light thereof is applied to the light detection device 109, and there, predetermined signals are detected therefrom by the light detection device 109. Assuming that the direction of tracks of the optical recording medium 113 is perpendicular to the figure, a push-pull signal as a tracking servo signal is acquired from the signal expressing a difference in luminous energy between both sides of the light spot formed on the light detection device 109 about the optical axis of the beam thus having returned from the optical recording medium.

When the diffraction grating of the curve 201 shown in FIG. 2 having the comparatively large grating pitch is applied in this system, as the diffraction efficiency is symmetrical with respect to +/− angle variation about the central point at which the incidence angle is 0 degrees, the push-pull signal obtained from the diffracted light indicates a true tracking servo signal. However, when the diffraction grating of the curve 202 shown in FIG. 2 having the comparatively small grating pitch is applied, as the diffraction efficiency is not symmetrical with respect to +/− angle variation about the central point at which the incidence angle is 0 degrees, the push-pull signal obtained from the thus-diffracted light does indicate a true tracking-servo signal. In fact, as shown in FIG. 2, on the curve 202, the diffraction efficiency increases as the angle increases in the plus direction while the diffraction efficiency decreases as the angle increases in the minus direction, in the range A shown in FIG. 2 showing an actual range of incident angle in a practical optical head device for example.

Such an imbalance in the diffraction efficiency between both sides causes an offset in the push-pull signal. Thereby, even when the optical head is positioned accurately on a track, the tracking servo signal does not indicate a zero value, and, thus, a proper tracking servo control may not be achieved in the optical disk drive.

On the other hand, improvement in the speed of reproduction is demanded for such an optical disk drive carrying such an optical head device. In order to raise the S/N ratio in signal detection for the purpose of improvement in the speed of reproduction, it is required that, as for the polarization diffraction grating used in the optical head, a +1-th diffracted light should have a high diffraction efficiency therein on an occasion of an incidence thereunto at near the right angle (approximately 0±5 degrees). However, when the grating pitch is made smaller as mentioned above, the diffraction efficiency has a peak at a specific incidence angle (Bragg angle) other than the right angle, and thus, the diffraction efficiency near the right-angle incidence may be degraded relatively.

For the purpose of miniaturizing in size and reducing the costs of such an optical head device or an optical pickup, an optical system employing a polarization hologram device as a polarization beam-splitting device takes attention. Same as the above-mentioned polarization diffraction grating, the polarization hologram device is applied for the purpose of separating a going beam and a returning beam. Such a type of beam splitting device is advantageous in terms of the size thereof in comparison to a conventional polarization beam splitter or so.

Furthermore, the polarization hologram device has other advantages in that the beam path design on the optical system becomes easier, and also, the number of parts/components can be reduced, since a signal detection device can be disposed on a same plane on which a laser light source is disposed. Moreover, by applying the polarization hologram device, a provision of a single common beam path is enough even in case writing/reading is performed on a plurality of recording media with different recording densities, such as a CD, a DVD, and an optical disk suitable for a blue wavelength, for example.

As such a polarization hologram device, Japanese laid-open patent application No. 2000-221325 discloses a technology of manufacturing a polarization beam-splitting device by which cyclic grating is formed by performing a patterning exposure of a polydiacetylene orientation film formed on an optical isotropic substrate with an ultraviolet ray at a sufficient yield, for example. According to this, in case the patterning exposure of the polydiacetylene orientation film acting as a birefringent material layer is performed with the ultraviolet ray in manufacture of the polarization beam-splitting device, the cyclic grating parallel to the orientation direction is formed by a way of making coincident the orientation direction of polydiacetylene orientation film with the patterning direction. When the cyclic grating is thus made in coincidence with the above-mentioned orientation direction, the diffraction efficiency can be increased thereby, and, also, variation in the diffraction efficiency can also be well controlled.

Moreover, Japanese laid-open patent application No. 2000-75130 discloses an inexpensive polarization beam-splitting device, for which production thereof does not take a much time, and, also, it does not need a complicated production process. As to this device, in order to separate two polarization components which intersect perpendicularly, a birefringent film having a refractive index variable according to a polarization plane of an incident light is loaded onto a transparent substrate as a cyclic patterned indented grating, and an isotropic overcoat layer is further loaded on thereon. Thus, a polarization beam-splitting device is obtained which divides an incident light with orthogonal polarization directions into a 0-th light and diffracted lights. In this device, the above-mentioned birefringent film includes a high polymer birefringent film (for example, an organic drawn high polymer film).

Moreover, Japanese laid-open patent application No. 9-63111 discloses one example of a laser light source employing a polarization hologram device. In this art, in order to achieve a configuration in that a light-emitting device and a light-receiving device for signal detection are mounted in a common cap, a polarization hologram device is applied, and, a part of a light obtained from the hologram device is utilized as an output monitoring light.

However, according to a theory, such a type of a polarization hologram device has a maximum possible diffraction efficiency of as high as approximately 40%. Moreover, when it is applied in an optical pickup etc., a laser light once passing through the polarization hologram device is reflected by a disk-type recording medium, and, after that, it is diffracted by the polarization hologram device, the thus-obtained light being then applied to a light-receiving device for signal detection. Accordingly, the actually applicable substantial overall diffraction efficiency may not be high enough. Moreover, a variation in the diffraction efficiency may also occur not only due to a particular product but also due to some error in assembly of a polarization hologram device into an optical pickup, or so. By these factors, the actually applicable diffraction efficiency thereof may not be expected sufficiently high.

SUMMARY OF THE INVENTION

An object of the present invention is to provide a polarization diffraction grating with a configuration in that an offset in a tracking servo signal occurring due to the diffraction characteristic of the grating's volume property can be effectively reduced even when the grating pitch is reduced so as to miniaturize the machine which employs the device.

Another object of the present invention is to provide an optical head device employing such an improved beam splitting device.

Furthermore, another object of the present invention is to provide a polarization diffraction grating in that a +1-th light diffraction efficiency occurring near the right-angle incidence even in case the grating pitch is made smaller can be improved, and to provide an optical head device which employs such an improved beam-slitting device, and thus, has a capability of reproducing information at a high reproduction rate.

A polarization diffraction grating according to the present invention includes:

two media having different orientation states arranged alternately and cyclically, wherein each boundary between the media forms an oblique rectangular shape.

Another object of the present invention is to provide a semiconductor laser unit acting as a light source of an optical head device or so, which employs a polarization hologram device as a beam splitting device, and has an improved light-receiving efficiency in a light-receiving device for a beam incident thereonto through the polarization hologram device.

A semiconductor laser unit according to the present invention includes:

a semiconductor laser light source applying a laser beam onto a pit formed on an optical information recording medium;

a light-receiving device performing photoelectric transformation onto a light reflected from the optical recording medium;

a diffraction grating performing polarization separation of the light emitted from the semiconductor laser light source and also of the light reflected from the optical recording medium; and a cap protecting the semiconductor laser light source and the light-receiving device, wherein:

the semiconductor laser light source and the light-receiving device are mounted in the cap, side by side;

an opening is provided in the cap at a position through which a beam from the semiconductor laser light source exits the cap; and the diffraction grating is provided oblique with respect to an optical axis of the semiconductor laser light source.

As illustrated in FIG. 8 or FIG. 19, a diffraction grating has a feature of light-incidence-angel-dependent diffraction efficiency such that the diffraction efficiency thereof on +1-th diffraction has a peak for a light incident angle not coincident with the right angle but shifted therefrom by a predetermined angle (Bragg angle). According to the present invention, the diffraction grating itself is inclined with respect to a plane perpendicular to the optical axis of the light source or a direction of a chief ray of a beam incident onto the diffraction grating by a predetermined angle, or each boundary line between different types of media which form the diffraction grating is inclined by a predetermined angle (as shown in FIGS. 4 through 7). Thereby, it becomes possible to effectively increase the optical energy utilizable in the diffracted light received through the diffraction grating, with respect to the optical energy of a light incident on the diffraction grating, and, thus, to effectively improve the optical energy usage efficiency in the optical head device or semiconductor laser unit, effectively.

BRIEF DESCRIPTION OF DRAWINGS

Other objects and further features of the present invention will become more apparent from the following detailed description when read in conjunction with the accompanying drawings.

DETAINED DESCRIPTION OF THE PREFERRED EMBODIMENTS

Figure 4:
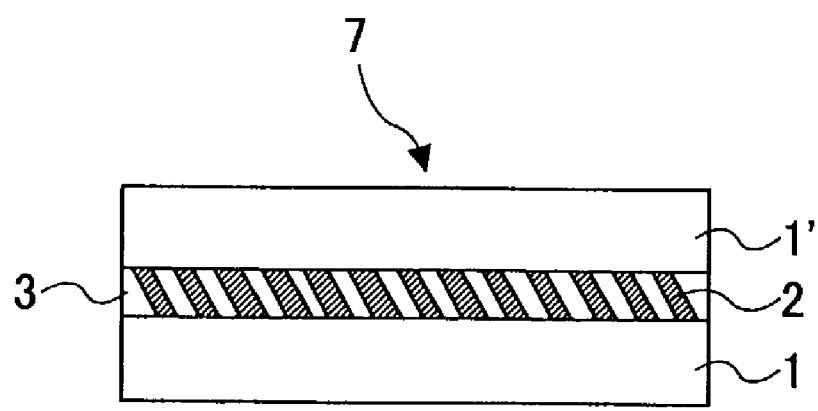
FIG. 4 shows a general partial sectional view of a polarization diffraction grating in a first embodiment of the present invention.

Hereafter, a first embodiment of the present invention will now be described with reference to figures. FIG. 4 is a general outline sectional view of a polarization diffraction grating according to a first embodiment of the present invention. In FIG. 4, two types of media 2 and 3 having different orientation states respectively are arranged alternately cyclically. As shown, boundaries between the different types of media 2 and 3 are made oblique, and, thus, each element has an oblique rectangular shape.

Thus, this polarization diffraction grating 7 has a configuration in that the media 2 and media 3 having the different orientation states are arranged alternately cyclically on a substrate 1 with a transmissivity, such as a glass, a plastic, or so, wherein boundaries between of both different types of media 2 and 3 are made-oblique with respect to the substrate 1. As mentioned above, each element of these medium 2 and 3 has a sectional shape of an oblique rectangular or a parallelogram. By creating such an oblique rectangular structure, a +1-th diffraction efficiency shown at a time when a laser beam is incident thereon at a right angle can be improved.

On the top of this oblique cyclic structure, a transmissive substrate 1' for the purpose of protection is mounted. The provision of such a transmissive substrate is preferable for the purpose of positive protection of the grating surface and also of preventing degradation of wavefront of a light which passes through this polarization diffraction grating 7, but not mandatory.

The above-mentioned medium 2 and medium 3 having the different orientation states may have a birefringent property. However, it is preferable that one thereof has a birefringent property while the other is an isotropic medium. Thereby, a range of materials which may be applied to the media 2 and 3 can be widened.

Furthermore, in order to achieve the above-mentioned object of the present invention, the above-mentioned polarization diffraction device 7 should form a polarization hologram having a property in that it has a high transmissivity for a going beam directed toward an optical recording medium in an optical head device, while it has a high diffraction efficiency for a returning beam from the optical recording medium. For this purpose, the grating made of the above-mentioned two types of media 2 and 3 should have an oblique sectional shape. Also, the medium thereof having the birefringent property should show a refractive-index anisotropic property in that the refractive indexes thereof on two perpendicular directions on a plane parallel to the substrate 1 are different from one another, and, also, the refractive index thereof on one of these two perpendicular directions should be approximately equal to the refractive index of the above-mentioned isotropic medium, in case one type of medium of the above-mentioned two types of media 2 and 3 is the isotropic medium.

Figure 5A:
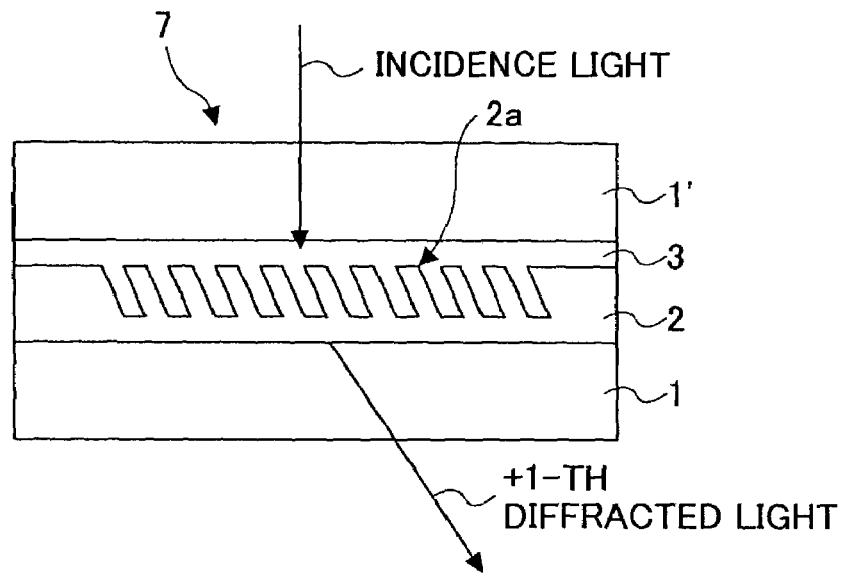
FIGS. 5A and 5B illustrate a basic configuration and a basic function of a polarization diffraction grating in a second embodiment of the present invention, and also, illustrate a diffraction angle of the same with respect to an incident angle.
Figure 5B:
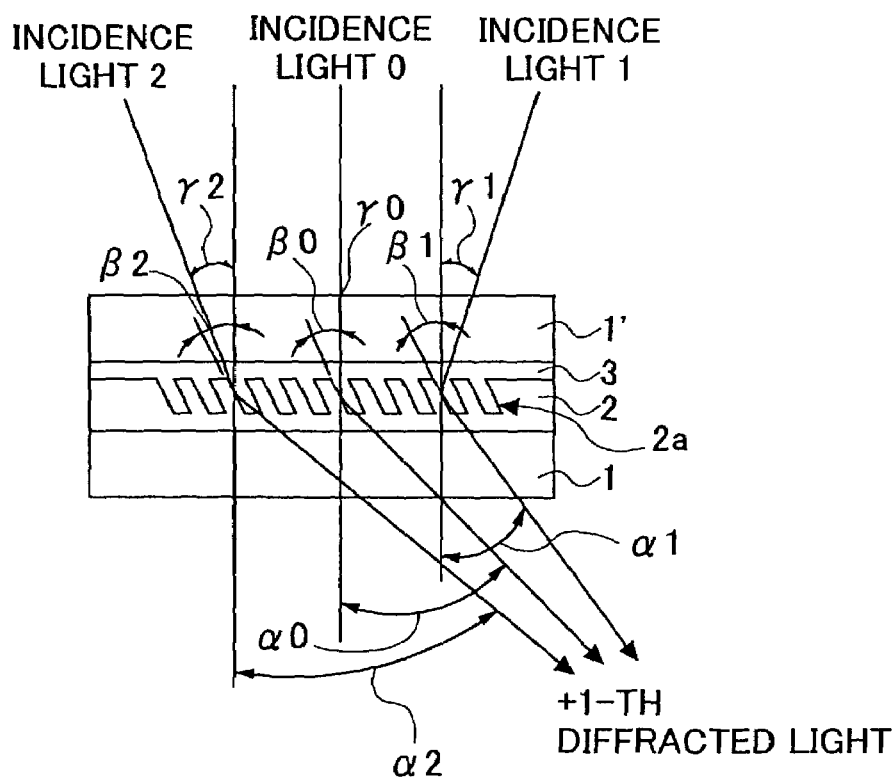

FIGS. 5A and 5B illustrate a polarization diffraction grating according to a second embodiment of the present invention. FIG. 5A shows a general outline sectional view of the polarization diffraction grating 7 in the second embodiment of the present invention, and FIG. 5B shows a relation between the incidence angle of an incidence beam onto the polarization diffraction grating 7, the angle of inclination of the grating, and the diffraction angle of a diffracted beam therefrom. As shown in FIG. 5A, this polarization diffraction grating 7 having a birefringent medium 2 has a patterned-indented-surface grating structure (rectangular grating) 2a with a surface of an oblique patterned indented shape on a transparent substrate 1, and a medium 3 showing an optical isotropy is provided on the birefringent medium 2, and a transparent substrate 1' is provided thereon so as to cover it.

That is, in this polarization diffraction grating 7, the birefringent medium 2 which has the patterned-indented-surface grating structure (rectangular grating) 2a is mounted on the substrate 1 of transparency, such as a glass and a plastic. In this configuration, the patterned-indented grating structure has oblique rectangular shapes as shown. Then, the optical isotropic medium 3 is provided on this patterned-indented structure (rectangular grating) 2a, and, after that, the transparent substrate 1' is mounted thereon. Thus, by making the patterned-indented structure (rectangular grating) 2a having the rectangle shapes thus inclined, the +1-th diffraction efficiency obtained at a time a beam is applied at a right angle thereonto can be improved effectively as will be described later.

In comparison to the configuration shown in FIG. 4, the above-mentioned second embodiment is different from the first embodiment in that, according to the second embodiment as shown in FIGS. 5A and 5B, the birefringent medium 2 is mounted on the transparent substrate 1, and, the patterned-indented grating (rectangular grating) 2a with the rectangular shapes is formed into the birefringent medium 2 up to a middle depth of the thickness thereof from the top as shown. In other words, the bottom of the patterned-indented grating does not reach the bottom of the birefringent medium 2 itself. Thereby, it is not necessary to make the film thickness of the birefringent medium 2 coincide with the depth of the grating strictly, and, thus, it becomes possible to apply the medium 2 with an arbitrary film thickness.

Thus, the present invention may be embodied either in such a configuration as that shown in FIG. 4 or in such a configuration as that shown in FIGS. 5A and 5B.

Figure 1:
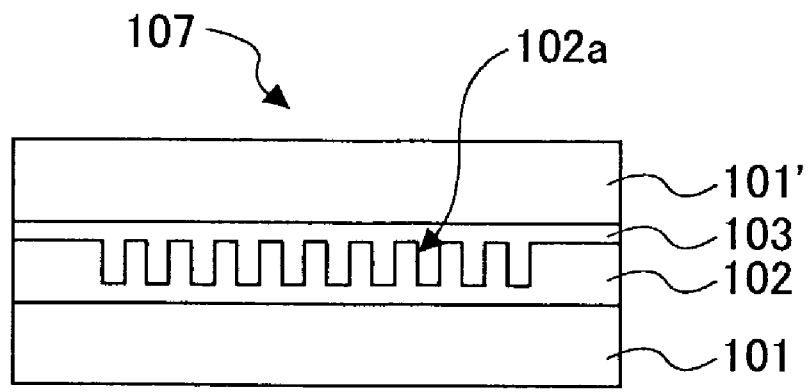
FIG. 1 shows a general partial sectional view of a polarization diffraction grating in the related art.
Figure 2:
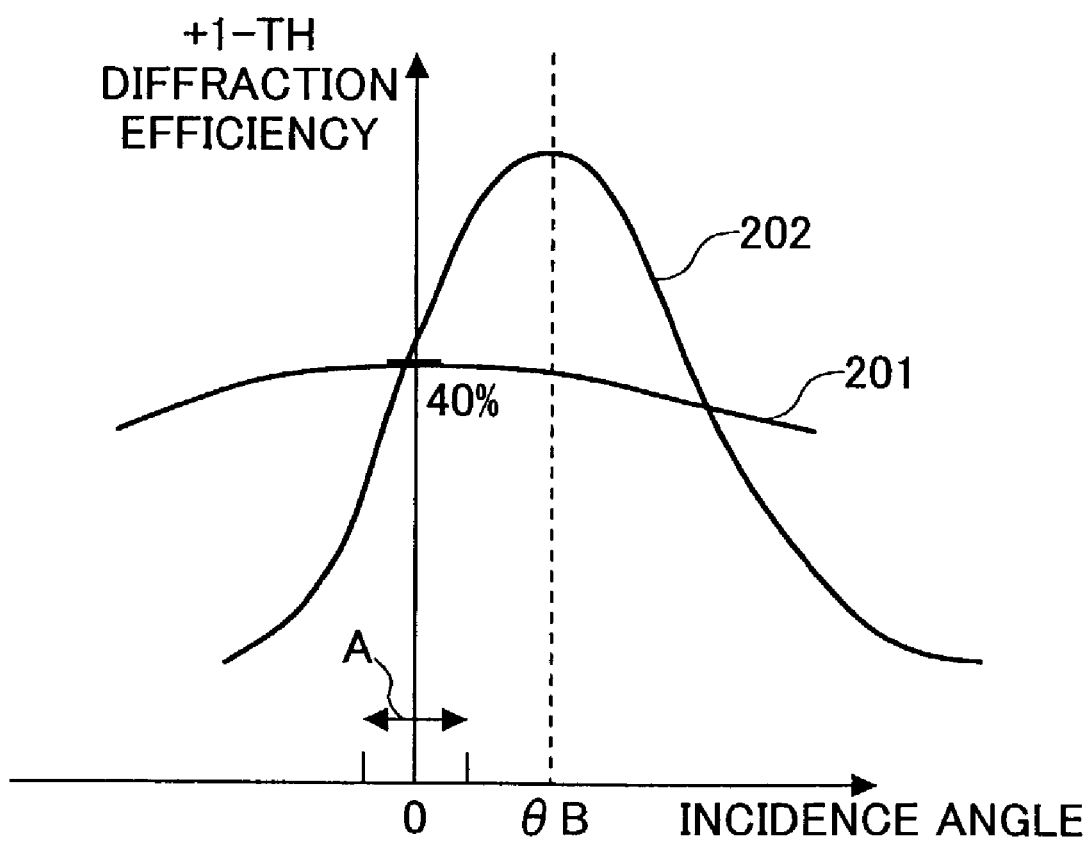
FIG. 2 illustrates a relation between the incident angle of an incident light onto an rectangular grating of the polarization diffraction grating shown in FIG. 1, and a diffraction efficiency of a +1-th diffracted light.
Figure 8:
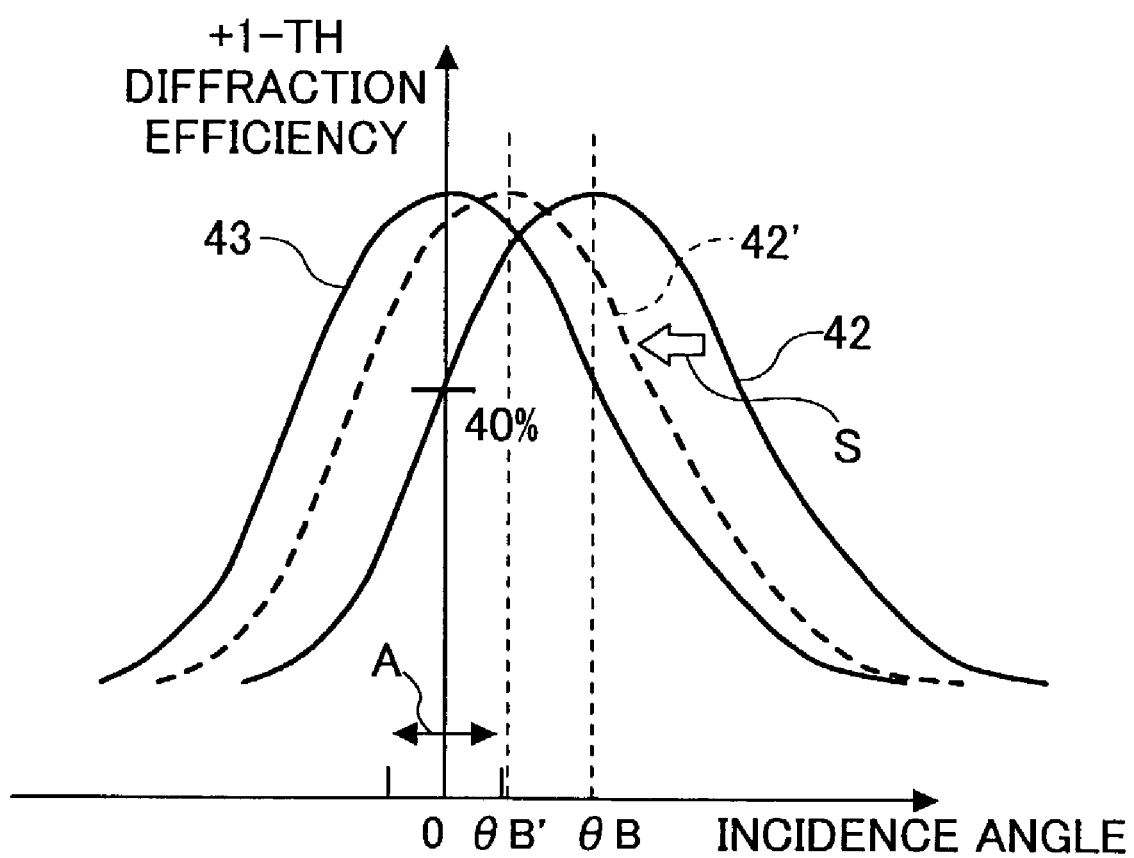
FIG. 8 illustrates diffraction efficiency on +1-th diffraction of a polarization diffraction grating with respect to an incident angle.

FIG. 8 is a graph of a +1-th diffraction efficiency with respect to a light incidence angle on a polarization diffraction grating with a grating pitch of 1.6 micrometers. As shown, a curve 42 expresses a characteristic of a conventional right-angle rectangular grating structure as shown in FIG. 1, and has a peak of diffraction efficiency at a Bragg angle θB. On the other hand, a curve 42' shows a characteristic in case the oblique rectangular grating structure 2a as shown in FIG. 4 or FIGS. 5A and 5B.

In this case, the oblique direction of the rectangular grating structure 2a applied is a direction inclined oppositely with respect to the normal of the substrate to the diffraction direction of the +1-th diffracted light exiting the rectangular grating stricture 2a, as shown in FIG. 5A. By thus-appropriately inclining the projection direction of each element of the patterned-indented rectangular grating structure as shown in FIG. 4 or FIGS. 5A and 5B, an incidence angle of an incident light at which the diffraction efficiency on the +1-th diffracted light shows a peak is shifted toward the lower side in comparison to the case where the projection direction of each element of the patterned-indented rectangular grating structure is a right angle as shown in FIG. 1, as indicated by an arrow S shown in FIG. 8.

Figure 6:
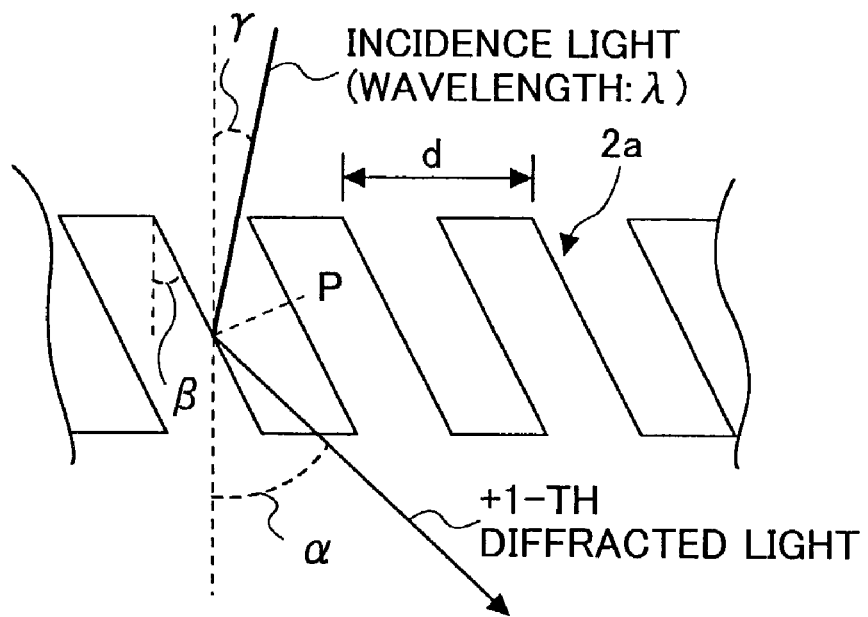
FIGS. 6 and 7 illustrate relations between an incident angle of an incident light, an inclination of an oblique rectangular grating and a diffraction angle of a diffracted light in the polarization diffraction grating shown in FIGS. 5A and 5B for illustrating a diffraction efficiency on +1-th diffraction of the same.

FIG. 6 illustrates a relation of an incidence angle of an incidence light onto the oblique rectangular grating 2a of the polarization diffraction grating 7, and the diffraction efficiency on the +1-th diffracted light. In the relation shown in FIG. 6, assuming that λ denotes a wavelength of the incidence light, 'd' denotes the grating pitch of the oblique rectangular grating, γ denotes the incidence angle of the incident light (in the medium of the diffraction grating), α denotes the +1-th light diffraction angle (in the medium of the diffraction grating), β denotes the inclination angle of the diffraction grating 2a, and 'n' denotes the refractive index of the medium of the diffraction grating, the following formula holds:

$$nd(\sin \gamma + \sin \alpha) = \lambda \quad (1)$$

Assuming that the Bragg angle (incidence angle at which the diffraction efficiency peak occurs) occurring in case of the oblique rectangular grating 2a is expressed by γ=θB', an incidence angle occurring when the angle formed between the incidence light and the normal P of the slope becomes equal to the angle formed between the normal P and the angle of the diffracted light become this Bragg angle θB'. Accordingly, the following formulas (2) and (3) hold:

$$\theta B' + \beta = \alpha - \beta \quad (2)$$

$$\theta B' = \alpha - 2\beta \quad (3)$$

From the formula (3), β=0 occurs at a time of applying the right-angle rectangular grating, and thus, θB'=α. That is, in this case, when the incidence angle becomes equal to the diffraction angle α, the Bragg angle occurs at which the diffraction efficiency becomes a peak. On the other hand, form the formula (3), when the angle of inclination β is given to the rectangular grating and thus the oblique grating is created in this manner, the Bragg angle θB' is decreased to an angle smaller than the diffraction angle α.

Accordingly, it can be said that, when the rectangular grating is inclined, as shown in FIG. 8, the peak of diffraction efficiency can be shifted to as in the curve 42' from that in the curve 42 toward the lower incidence angle side, as mentioned above. In other words, by inclining each rectangular grating element, the diffraction efficiency of the diffraction grating occurring on an incidence angle of an incident light nearer the right angle can be improved.

A third embodiment of the present invention will now be described. When applying the above-mentioned polarization diffraction grating as a beam-splitting device in an optical head device, in order to prevent creation of an offset in the push-pull signal which is used as a tracking signal, it is preferable that the peak of diffraction efficiency should occur at an angle of 0 degrees, i.e., at a time of the right-angle or perpendicular beam incidence.

Figure 7:
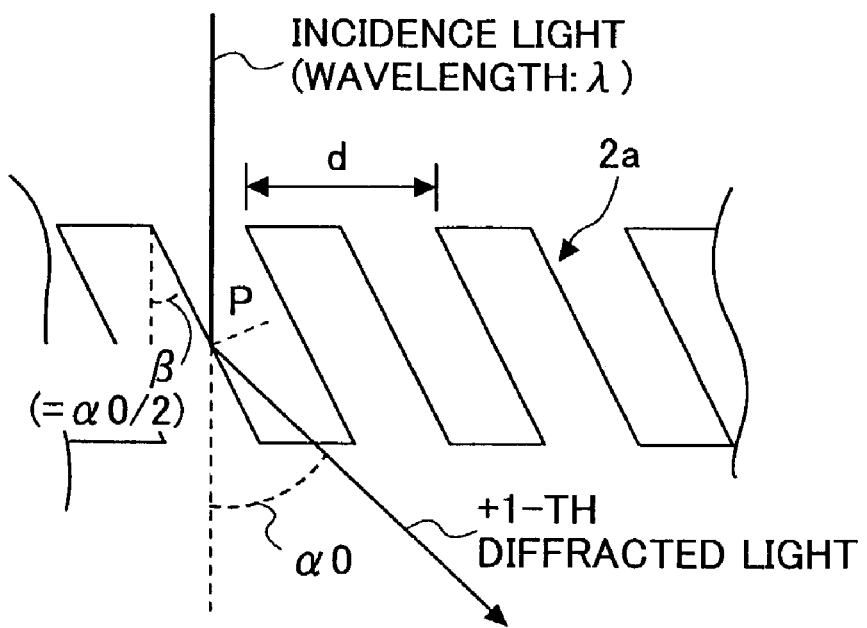

In order to cause the peak of diffraction efficiency to occur at a time of perpendicular beam incidence as the Bragg angle, assuming that the diffraction angle α in the diffraction grating medium at the time of perpendicular beam incidence is expressed as α=α0, as shown in FIG. 5B and FIG. 7, a setting should be made such that θB'=0 in the above-mentioned formula (3), $$\alpha 0 - 2\beta = 0,$$

and thus, when, $$\beta = \alpha 0/2 \quad (4)$$

the +1-th diffraction efficiency has a peak at the occasion of the perpendicular beam incidence.

The curve 43 of FIG. 8 denotes the +1-th diffraction efficiency characteristic with respect to the light incidence angle when a setting is made such that the angle β of inclination of rectangular grating 2a be one half the diffraction angle α0 in the diffraction grating medium so that the formula (4) holds. In this case, the perpendicular beam incidence thus provides the Bragg angle, the +1-th diffraction efficiency has a peak, and the positive and as a result, negative angle-dependency characteristics of the diffraction efficiency become symmetrical about the perpendicular beam incidence, and the peak diffraction efficiency becomes on the order of 72%.

Therefore, when applying the polarization diffraction grating according to the third embodiment of the present invention to an optical head device and arranging the polarization diffraction grating in a parallel beam, a converging beam or a diverging beam, the grating inclination angle β should be set according to the desired +1-th diffraction angle (in the diffraction grating medium) with respect to the chief ray of the reflected returning beam from the optical recording medium to the polarization diffraction grating as being α0.

In addition, the relation between the diffraction angle α0 in the diffraction grating medium and the diffraction angle α0' in the air after exiting the medium is expressed by the following formula:

$$n \cdot \sin \alpha 0 = \sin \alpha 0'$$

where 'n' denotes the refractive index in the diffraction grating medium.

In case where the diffraction grating is divided into a plurality of areas, and diffracted beams exiting there should be incident on different light-receiving areas of a light detection device, an average should be obtained from the required diffraction angles (in the diffraction grating medium) for the respective different light-receiving areas, and then be applied as α0 in the above-shown formula (4).

Figure 3:
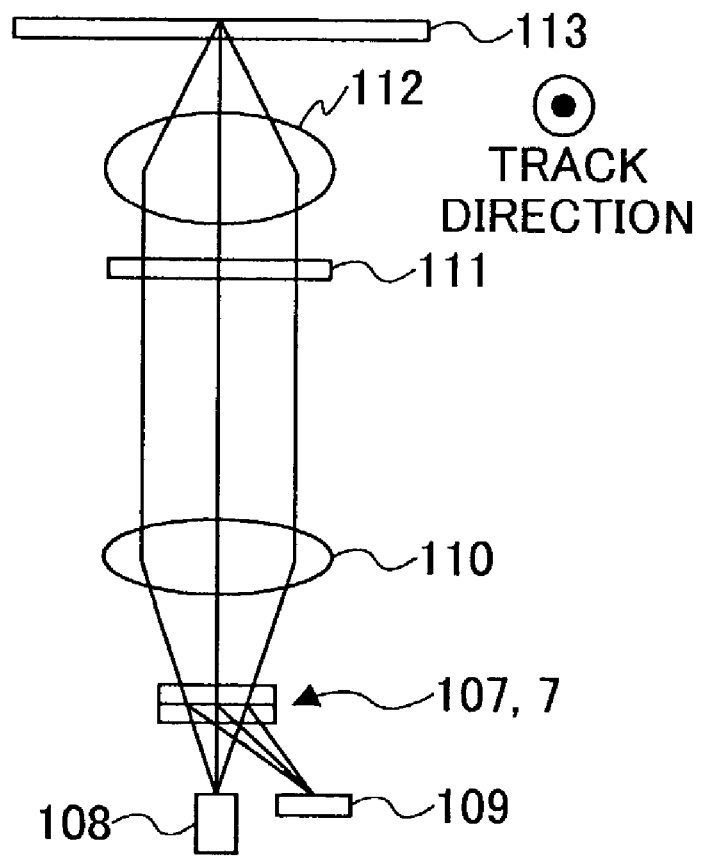
FIG. 3 shows a general view illustrating a configuration of one example of an optical head device employing the polarization diffraction grating shown in FIG. 1.

A fourth embodiment of the present invention will now be described. As shown in FIG. 3, when the polarization diffraction grating 7 is disposed in a convergent beam reflected by an optical recording medium, since the incident beam includes various incidence angles as shown in FIG. 5B, i.e., incident beam elements 0, 1 and 2, for example, it becomes not possible to obtain a peak diffraction efficiency for each of all elements of the incident beam merely by applying a representative single incident angle to the formula (4). In order to obtain the peak diffraction efficiency for each of all elements of the incident beam, the inclination angles of respective rectangular elements of the patterned-indented shape of the polarization diffraction grating should be set differently depending on the actual incident angles of respective beam elements.

That is, in FIG. 5B, for an area for the incident beam element 0, as has been described in the description of the third embodiment above, in the diffraction grating medium, the peak diffraction efficiency can be obtained when the inclination angle of the diffraction grating is set as:

$$\beta 0 = \alpha 0/2 \qquad (\gamma 0 = 0)$$

On other hand, for an area for the incident beam element 1, from the above-shown formula (3), the peak diffraction efficiency can be obtained when the inclination angle of the diffraction grating is set as:

$$\beta 1 = (\alpha 1 - \gamma 1)/2 \qquad (5)$$

similarly, for an area for the incident beam element 2, the peak diffraction efficiency can be obtained when the inclination angle of the diffraction grating is set as:

$$\beta 2 = (\alpha 2 - \gamma 2)/2 \quad (\gamma 2 = -\gamma 1) \qquad (6)$$

Thus, the greatest diffraction efficiency can be acquired for each of all the areas of the diffraction grating by setting the inclination angle β according to the incidence angle γ and the diffraction angle α in the diffraction grating medium for each of respective beam elements so that the Bragg angle should always occur.

A range of a diffraction grating in which the present invention described above is especially effective and advantageous will now be discussed by a theoretical approach. According to the present invention described above, a rectangular grating is inclined so as to seek a point at which the peak diffraction efficiency should occur in occasion of the perpendicular beam incidence onto the diffraction grating. In other words, an angle of inclination of the rectangular grating is sought at which the Bragg angle is 0 degrees. Then, a condition of the diffraction grating in which such a scheme of adjusting the inclination angle of the rectangular grating is especially effective will now be discussed.

The diffraction efficiency of a rectangle diffraction grating can be calculated from a theoretical formula according to a scalar diffraction theory which approximates a relevant grating as a thin plane type grating. The diffraction efficiency calculation theoretical formula for a rectangular grating according to-the scalar diffraction theory is as follows:

A phase change δ produced between a peak and a trough of a groove of a grating when a single-color light of a wavelength λ passes through the grating is expressed by the following formula:

$$\delta = \pi \cdot \Delta n T / \lambda \qquad (7)$$

where T denotes the grating depth and αn denotes the grating part refractive-index difference.

The diffraction efficiency (optical intensity efficiency) $\eta_m$ (at the perpendicular beam incidence) of ±m-th diffracted light is expressed by the following formula:

$$\eta_m = 4(\sin(m\pi q)/m\pi)^2 \sin^2 \delta \qquad (8)$$

where 'q' denotes the duty of the rectangular grating applied.

According to the formula (8), the diffraction efficiency of a rectangular grating can be calculated. However, although an actual measurement value and a thus-obtained calculation value by the formulas (8) are mostly in agreement for a range of Q such that Q<2, which Q value expresses the volume degree of a grating where $Q=2\pi\lambda T/nd^2$, an actual measurement and a calculation value cannot be in agreement for a range of Q such that Q>2. Specifically, when Q>2, the actual value of peak diffraction efficiency (in a case of perpendicular beam incidence) of the rectangular grating does not reach 40.5% of the theoretical value, and it decreases as Q increases in the range of Q>2. Therefore, in order to achieve a precise estimation of the diffraction efficiency for the range of Q>2, a numerical computation according to a vector diffraction theory is needed.

The above-mentioned fact may mean that a diffraction grating in the range Q>2 has a characteristic of a volume grating, a peak of diffraction efficiency occurs at a certain incidence angle (Bragg angle) other than that at the perpendicular incidence there, and thus, the diffraction efficiency is rather degraded in an occasion of perpendicular beam incidence.

Accordingly, it can be said that the present invention described above according to the first through fourth embodiments described above with reference to FIGS. 4, 5A, 5B, 6, 7 and 8, i.e., a way of controlling the diffraction efficiency of shifting the Bragg angle into the perpendicular incidence, is especially effective and advantageous for a diffraction grating configured in the range such that Q>2. Such a type of diffraction grating is demanded for the purpose of effective miniaturization of an optical head device as mentioned above, for example.

A fifth embodiment of the present invention will now be described. The fifth embodiment of the present invention comprises a method of manufacturing the polarization diffraction grating according to any of the above-mentioned first through fourth embodiments of the present invention. FIGS. 9A through 9E and 10A through 10D illustrate this manufacturing method.

Figure 9A:
FIGS. 9A through 9E and 10A through 10D illustrate a method of producing a polarization diffraction grating according to the present invention.

First, the birefringent medium 2 is formed on the transparent substrate 1. Specifically, for this purpose, a film of the birefringent medium 2 is stuck on the substrate 1, the birefringent medium 2 is applied by a spin coating way or so, or the film of the medium 2 is formed by a physical film forming method, such as a vacuum depositing or a vacuum evaporation method, a sputtering method or so, as shown in FIG. 9A.

Figure 9B:
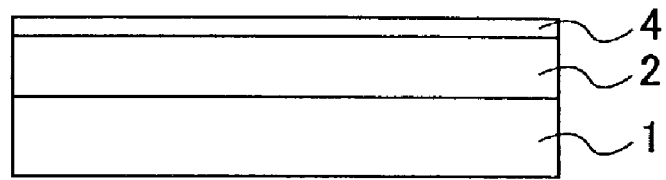
Figure 9C:
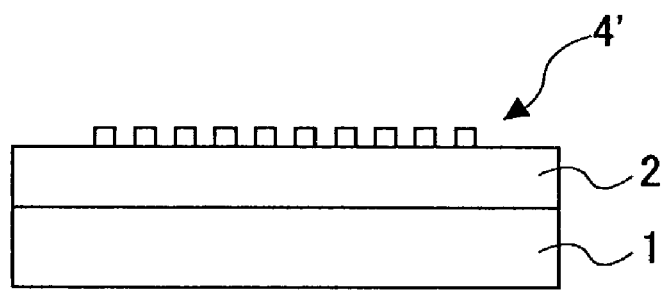
Figure 9D:
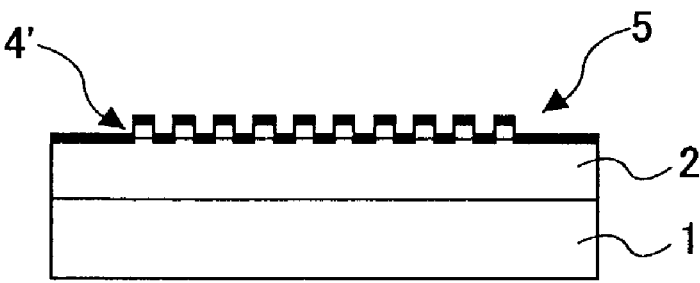

Next, a photoresist layer 4 is formed, by a spin coating method or so, on the birefringent medium 2, as shown in FIG. 9B. Next, exposure is performed on the photoresist layer 4 according to a predetermined grating pattern, and, then, developing is performed thereon. Thereby, a pattern 4' for the diffraction grating is formed on the birefringent medium 2, as shown in FIG. 9C. After that, a metal layer 5 of a material such as aluminum (Al), chromium (Cr), or so is formed by a vacuum depositing method, a sputtering method, etc., as shown in FIG. 9D.

Figure 9E:
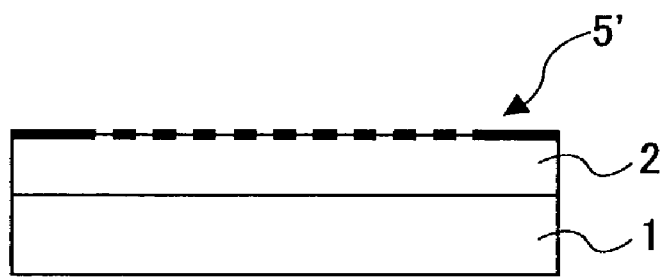

Next, the above-mentioned photoresist pattern 4' and parts of the metal layer 5 formed thereon are removed by an elution process with an organic solvent, such as acetone, or the same are removed by a decomposition process performed in an oxygen plasma, as shown in FIG. 9E. FIG. 9E shows a state in which a grating pattern 5' of the metal layer remains on the birefringent medium 2 except the areas at which the above-mentioned photoresist pattern 4' has been thus removed therefrom. The metal grating pattern 5' remaining is used as a mask for a dry etching process to be performed subsequently.

Figure 10A:
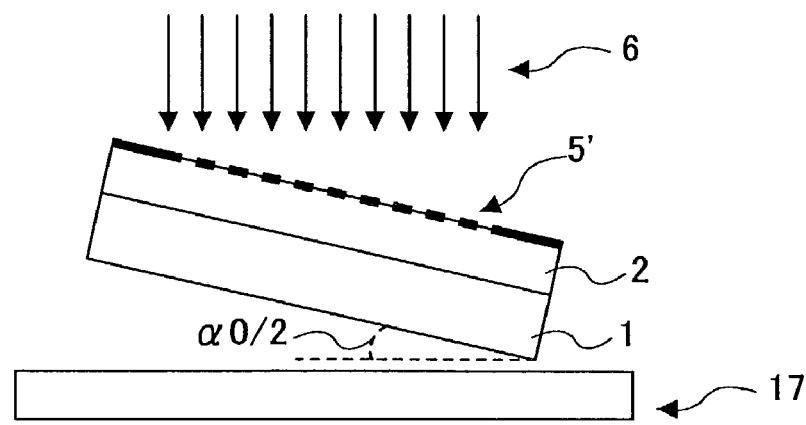

Next, as shown in FIG. 10A, the birefringent medium 2 having the metal grating pattern 5' formed thereon as shown in FIG. 9E is put into a dry etching machine (not shown) for performing the dry etching process, such as an ion beam etching process, a reactant ion (beam) etching process, or a plasma etching process. Then, the etching process is performed with the metal pattern 5' used as a mask as mentioned above. At this time, the substrate 1 is inclined by the angle $\alpha 0/2$, as shown in FIG. 10A, with respect to an opposite electrode 17 of the above-mentioned dry etching machine, to which electrode ion beams, plasma beams or so 6 are directed. Thereby, the etching process is performed perpendicularly to the opposite electrode 17, and, thus, is performed along the direction oblique to the normal of the substrate 1.

Figure 10B:
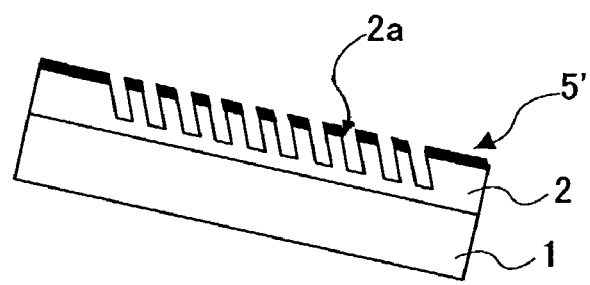
Figure 10C:
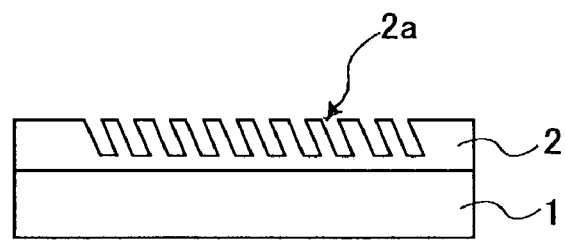

Consequently, after the etching process, as shown in FIG. 10B, obliquely extending holes are formed in the medium 2 according to the metal pattern 5'. After that, an acid is applied to remove the metal mask 5', and, as a result, the rectangular grating 2a of the patterned-indented shape oblique to the substrate 1, as shown in FIG. 10C is formed in the birefringent medium 2.

In order to realize the Bragg angle $\theta B'=0$ degrees as mentioned above, i.e., a perpendicular beam incidence should cause the Bragg angle, especially as shown in FIG. 10A, the inclination angle of the substrate 1 with respect to the opposite electrode 17 of the etching machine is set as one half $(\alpha 0/2)$ of the required diffraction angle $\alpha 0$ to occur at a time of perpendicular beam incidence (in the diffraction grating medium). Moreover, it is preferable that, in an actual etching process shown in FIG. 10A, the substrate 1 is rotated around an axis perpendicular to the opposite electrode 17 of the etching machine with the inclination angle of the substrate 1 kept unchanged. Thereby, the etching homogeneity within the grating surface can be improved in the diffraction grating.

Figure 10D:
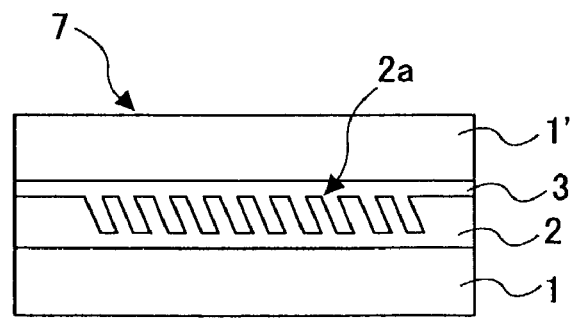

Then, as shown in FIG. 10D, the isotropic medium 3 is provided on the thus-obtained patterned-indented part of the birefringent medium 2 in a manner such that the respective grooves of the patterned-indented part are filled with the isotropic medium 3. After that, the transparent substrate 1' is put thereon. As for the refractive index of the isotropic medium 3, at this time, it is preferable that it is equal to an ordinary-ray refractive index of the birefringent medium 2 or to an extraordinary-ray-refractive index of the same. Thereby, the transmissivity and the diffraction efficiency of the thus-obtained polarization diffraction grating 7 can be increased effectively.

In addition, the transparent substrate 1' shown in FIG. 10D is not necessarily needed as long as the surface flatness of the isotropic medium 3 is secured.

Moreover, although a so-called lift-off method is applied for creating the metal mask for the dry etching in the process described above with reference to FIGS. 9A–10D, another method may also be applied instead, as will now be described. That is, a metal layer is directly formed on the birefringent medium 2 shown in FIG. 9A. Then a photoresist is applied on this metal layer, exposure is performed for the grating pattern, and development is performed thereon. Thus, the grating pattern of photoresist is formed. Then, the metal layer is etched with a use of the thus-formed grating pattern as an etching mask (through a dry etching or a wet etching way). After that, the photoresist is removed, and the state shown in FIG. 9E is thus created.

Moreover, in order to produce a polarization diffraction grating with grating inclination angles ($\beta 0$, $\beta 1$, $\beta 2$, for example, shown in FIG. 5B) by which the beam-element incidence angle is made coincide with the Bragg angle throughout the area of the grating as described with reference to FIG. 5B, the following scheme should be applied. The ion beam to be applied in the dry etching process shown in FIG. 10A is not a parallel beam but a divergent or converging beam is applied, and the substrate 1 is inclined from the opposite electrode 17 to which this ion beam is directed.

A sixth embodiment of the present invention will now be described. According to the sixth embodiment, the specific material of the birefringent medium 2 of the polarization diffraction grating 7 according to any of the above-mentioned embodiments of the present invention is discussed.

A birefringent inorganic crystal film may be applied as the birefringent medium 2. In this case, the substrate 1 should not be necessarily provided. Alternatively, an oblique deposited film of an inorganic material, or an orientation film of an organic material may be applied. Especially, as a material of the birefringent medium 2, an organic drawn film produced in a manner of an organic high polymer being drawn while it being heated. In fact, such organic drawn films can be produced as the birefringent media in a mass-production manner with low costs, and, thus, they are very suitable as the birefringent media for the polarization diffraction gratings according to the present invention.

In order to produce a polarization diffraction grating 7 with a reduced pitch according to the present invention, it is required that the material of the birefringent medium itself is suitable to micro fabrication accordingly. Although a lithium nitrate ($LiNbO_3$) crystal is popular as a birefringent medium, it is not suitable for micro fabrication, and a pitch of merely approximately 5 micrometers can be produced thereof at most.

Then, according to the present embodiment, the above-mentioned organic drawn film is proposed as the birefringent medium 2 suitable for micro fabrication for the polarization diffraction grating with a finely reduced pitch. This organic drawn film is suitable for micro fabrication, and, especially, is suitable so that a grating with obliquely-extending deep grooves as described above with reference to FIGS. 4 through 10D can be produced therewith easily.

Moreover, since this material is of an organic material, it provides 'a bite' satisfactory with a polymer material which may be used as a filler material having the refractive index thereof controlled and thus may be used to fill the grooves of the diffraction grating formed in the birefringent medium in a condition in which it can well enter the grooves so as to fill them even the grooves of the grating are deep with a finely reduced pitch. Such a feature of the material has been already confirmed.

As the material of the organic drawn film, an organic material, such as a polyester family, a polyimide family, a polyethylene family, a polycarbonate family, a polyvinyl alcohol family, a polymethyl methacrylate family, a polystyrene family, a polysulfone family, a polyether sulfone family, a polyethylene terephthalate family, or so, may be applied. Moreover, when such an organic drawn film is applied, the organic drawn film acting as the birefringent medium 2 may be stuck onto the transparent substrate 1 with an adhesives, and then, the production method described above with reference to FIGS. 9A through 10D may be applied.

Figure 11:
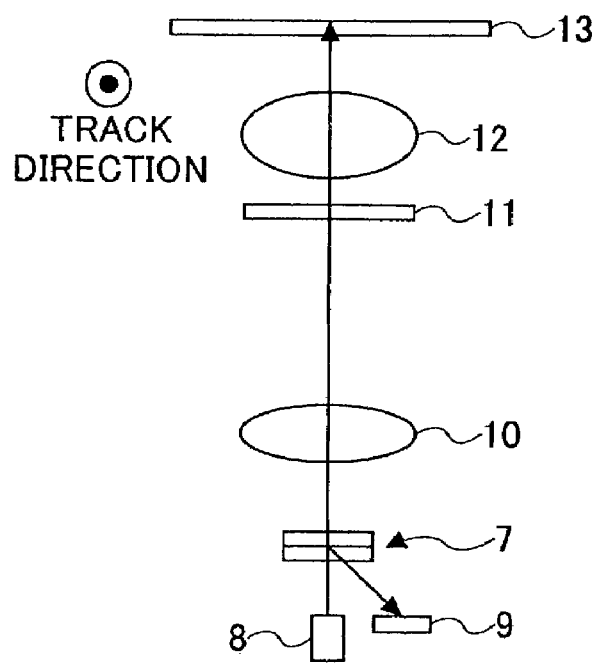
FIG. 11 illustrates a general view illustrating a configuration of an optical head device in a seventh embodiment of the present invention.

Next, a seventh embodiment of the present invention will now be described. The seventh embodiment is an optical head device employing the polarization diffraction grating 7 according to any one of the above-mentioned embodiments of the present invention. FIG. 11 shows an outline configuration of this optical head device.

As shown, the optical head device includes a light source 8 made of a semiconductor laser, etc., the polarization diffraction grating 7, a collimator lens 10, a ¼-wavelength plate 11, an object lens 12, and a light detection device 9 made of a multi-beam-incidence-area-divided photodiode, for performing information recording/reproduction onto/from an optical recording medium (optical disk) 13.

A beam emitting from the light source 8 is set in a polarization direction such that almost all thereof is transmitted by the polarization diffraction grating 7, and is collimated by the collimator lens 10. After that, the beam is transformed into a circle polarization state with-the ¼-wavelength plate 11, and is condensed by the object lens 12 onto the optical recording medium 13. The reflected light from the optical recording medium 13 is transformed to have a polarization direction which intersects perpendicularly with that of the going beam with the ¼-wavelength plate 11, is transformed into a convergence beam by collimator lens 10, and then, is applied to the polarization diffraction grating 7. Since the going beam directed toward the optical recording medium has the polarization which intersects perpendicularly with that of the returning beam reflected by the optical recording medium, the returning convergence beam applied to the polarization diffraction grating 7 is almost diffracted thereby, the +1-th diffracted beam is thus applied to the light detection device 9, and signal detection is performed by the light detection device 9 from the incident beam.

Assuming that the direction of each track of the optical recording medium 13 is perpendicular to the FIG. 11, the push-pull signal as the tracking-servo signal is acquired as a signal indicting the difference in luminous energy of the returning beam incident onto the polarization diffraction grating 7 between both the sides of the beam spot about the optical axis, according to a well-known manner.

As described above, the problem in the related art is caused due to an imbalance in the diffraction efficiency between both the sides of the beam spot in the right-angle rectangular grating such as that shown in FIG. 1. Due to the above-mentioned imbalance in the diffraction efficiency of the polarization diffraction grating in the related art, an offset occurs in the push-pull signal acting as the tracking-servo signal even when the proper tracking-servo control is achieved.

This problem can be solved or at least effectively reduced in the optical head device according to the present embodiment in which the polarization diffraction grating having the oblique rectangular grating structure according to the present invention described above. Especially, when the diffraction grating according to the third or fourth embodiment described above is applied, as shown in FIG. 8, especially in the curve 43, the diffraction efficiency is symmetrical about the perpendicular beam incidence point with respect to plus/minus incidence angle variation (corresponding to right/left sides in FIG. 8). Accordingly, no offset occurs in the push-pull signal when the proper tracking-servo control is achieved. Further, by applying the polarization diffraction grating 7 according to the present invention as in the present embodiment, since the diffraction efficiency of more than 70% is obtained on the occasion of perpendicular beam incidence, in comparison to the diffraction efficiency of approximately 40% in the related art mentioned above, remarkable improvement in the diffraction efficiency and, thus, the optical-energy-usage efficiency can be archived.

Figure 12:
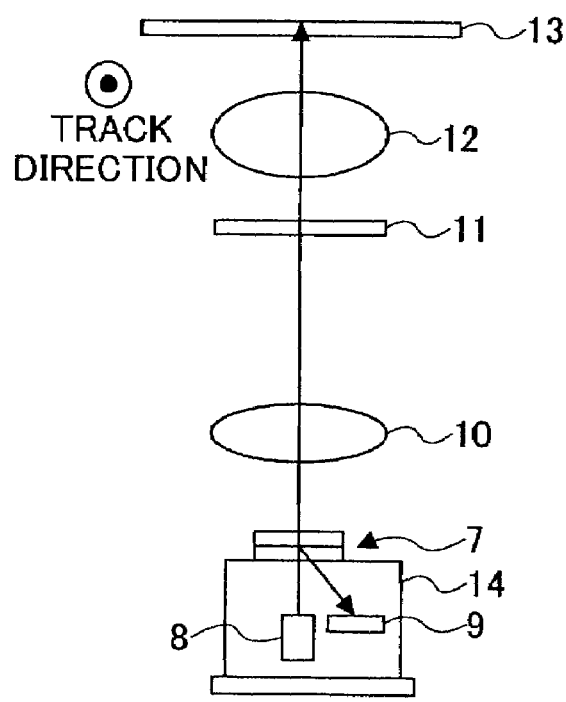
FIG. 12 illustrates a general view illustrating a configuration of an optical head device in an eighth embodiment of the present invention.

An eighth embodiment of the present invention will now be described. FIG. 12 shows an optical head device according to the eighth embodiment. In the optical head device shown in FIG. 12, differently from the configuration shown in FIG. 11, the light source 8, the light detection device 9, and the polarization diffraction grating 7 are integrated together in a case 14. By thus integrating the several parts/components, a time required for assembly can be effectively reduced, and, also, the adjustment work performed after that can be simplified effectively.

Figure 13:
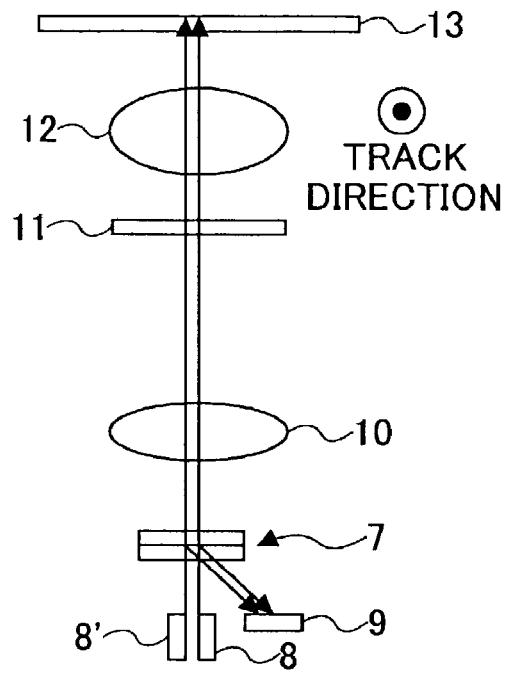
FIG. 13 illustrates a general view illustrating a configuration of an optical head device in a ninth embodiment of the present invention.

FIG. 13 shows an outline configuration of a two-wavelength optical head device according to a ninth embodiment of the present invention employing the polarization diffraction grating 7 according to any of the embodiments mentioned above according to the present invention. As shown, this optical head device includes a light source 8 made of a semiconductor laser or so for the wavelength of 780 nm, and another light source 8' made of a semiconductor laser or so for the wavelength of 660 nm. Other than them, the optical head device includes the polarization diffraction grating 7 according to the embodiment of the present invention, a collimator lens 10, a ¼-wavelength plate 11, an object lens 12 which has undergone aberration correction for the two wavelengths of 780 nm and 660 nm, and a light detection device 9 made of a multi-beam-incidence-area-divided photodiode or so, and performs recording/reproduction of information on/from an optical recording medium (optical disk) 13.

Since this two-wavelength optical head device has the two light sources 8 and 8' for the different wavelengths, this device can be applied for handling different types of optical recording media 13 having different recording densities, respectively. The different types of optical recording media 13 may be an optical disc of a CD system, and an optical disc of a DVD system for which recording can be made at a higher recording density as well-known. As for the CD system and the DVD system, since the recording densities differ therebetween, the operation wavelength of the light source to be applied differs therebetween, and also, the substrate thickness of the disk differs therebetween. For example, in a case of a CD-system disk using the wavelength of 780 nm, the substrate thickness is 1.2 mm, while, in a case of a DVD-system disk using the wavelength of 660 nm, the substrate thickness is set as 0.6 mm.

A beam emitting from each of the light sources 8 and 8' is set in a polarization direction such that almost all thereof is transmitted by the polarization diffraction grating 7, and is collimated by the collimator lens 10. After that, the beam is transformed into a circle polarization state with the ¼-wavelength plate 11, and is condensed by the object lens 12 onto the optical recording medium 1–3. The reflected light from the optical recording medium 13 is transformed to have a polarization direction which intersects perpendicularly with that of the going beam with the ¼-wavelength plate 11, is transformed into a convergence beam by collimator lens 10, and then, is applied to the polarization diffraction grating 7. Since the going beam has the polarization which intersects perpendicularly with that of the returning beam, the returning convergence beam applied to the polarization diffraction grating 7 is almost diffracted by the diffraction grating 7, the +1-th diffracted beam is thus applied to the light detection device 9, and appropriate signal detection is performed there from the incidence beam.

Assuming that the direction of each track of the optical recording medium 13 is perpendicular to the figure, the push-pull signal as the tracking signal is acquired as a signal indicting the difference in luminous energy of the returning beam incident onto the polarization diffraction grating 7 between both the sides of the beam spot about the optical axis.

As described above, the problem in the related art is caused due to an imbalance in the diffraction efficiency between both the sides of the beam spot in the right-angle rectangular grating such as that shown in FIG. 1. Due to the above-mentioned imbalance in the diffraction efficiency of the polarization diffraction grating in the related art, an offset occurs in the push-pull signal acting as the tracking-servo signal even when the proper tracking-servo control is achieved.

This problem can be solved or at least effectively reduced also in the optical head device according to the present embodiment in which the polarization diffraction grating having the oblique rectangular grating structure according to the present invention described. Especially, when the diffraction grating according to the third or fourth embodiment described above, as shown in FIG. 8, the curve 43, the diffraction efficiency is symmetrical about the perpendicular beam incidence point with respect to plus/minus incidence angle variation (corresponding to right/left sides in FIG. 8). Accordingly, no offset occurs in the push-pull signal when the proper tracking-servo control is achieved. Further, by applying the polarization diffraction grating 7 according to the present invention also as in the present embodiment, since the diffraction efficiency of more than 70% is obtained on the occasion of perpendicular beam incidence, in comparison to the diffraction efficiency of approximately 40% in the related art, remarkable improvement in the diffraction efficiency and thus the optical-energy-usage efficiency can be archived, same as in the above-mentioned seventh embodiment.

Figure 14:
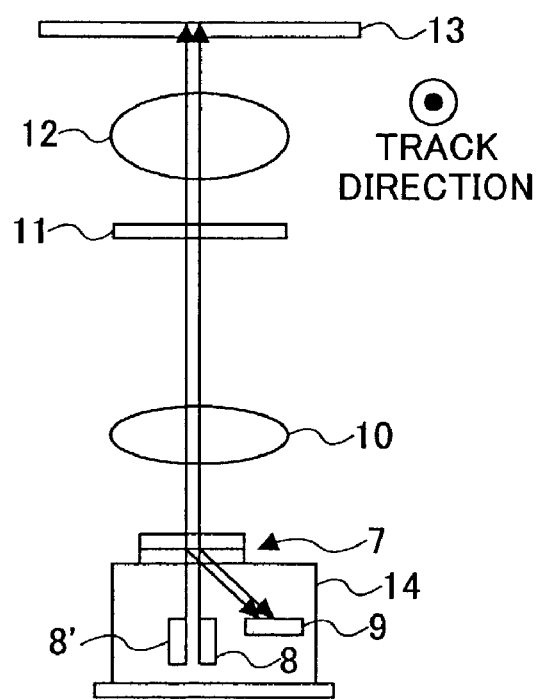
FIG. 14 illustrates a general view illustrating a configuration of an optical head device in a tenth embodiment of the present invention.

A tenth embodiment of the present invention will now be described. FIG. 14 shows an optical head device according to the eighth embodiment. In the optical head device shown in FIG. 14, differently from the configuration shown in FIG. 13, the light sources 8 and 8', the light detection device 9, and the polarization diffraction grating 7 are integrated together in a case 14. By thus integrating the several parts/components, a time required for assembly can be effectively reduced, and, also, the adjustment work performed after that can be simplified effectively.

Thus, according to the present invention especially in the first and second embodiments, by making each medium boundary of polarization diffraction grating oblique with respect to the normal of the substrate thereof, the +1-th diffracted beam angle dependency characteristic occurring due to a volume grating property which occurs when the grating pitch is reduced can be changed. As a result, the Bragg angle at which the +1-th diffraction efficiency becomes maximum can be shifted toward the low incidence angel range or the right angle point.

Especially, by inclining the medium boundary in a direction opposite to the direction in which the +1-th diffracted beam is diffracted, the Bragg angle at which the +1-th diffraction efficiency becomes maximum can be shifted toward the low incidence angel side, and, thus, the +1-th diffraction efficiency occurring in occasion of perpendicular beam incidence can be effectively improved.

Further, according to the present invention especially in the third embodiment described above, the Bragg angle at which the +1-th diffraction efficiency can be made into 0 degrees, i.e., the Bragg angel can be made to occur in occasion of perpendicular beam incidence. Thereby, it can be possible to set the diffraction efficiency symmetrical about the perpendicular beam incidence angle point with respect to plus/minus angle shift therefrom. Accordingly, in case this polarization diffraction grating is applied to an optical head device, it is possible that no useless offset occurs in the push-pull signal as the tracking-servo signal obtained through the polarization diffraction grating. Thus, a proper tracking-servo signal can be generated therefrom. In this configuration, as the +1-th diffraction efficiency can be made to have a peak in an actual operation, and, thus, in this occasion, the luminous energy which the light detection device receives can be effectively increased. Thereby, the S/N ratio of the optical head can be improved, and, thus high-speed information reproduction can be achieved.

Furthermore, according to the present invention especially in the fourth embodiment, the peak +1-th diffraction efficiency can be obtained throughout the area of the diffraction grating even when a convergent or divergent beam which includes beam elements respectively having different incidence angles in the strict sense by appropriately controlling inclination angle of each rectangular element of the diffraction grating. Accordingly, the maximum diffraction efficiency can be obtained in the strict basis, and, also, no useless offset occurs in the push-pull signal at all.

Furthermore, according to the present invention especially in the fifth embodiment, a polarization diffraction grating according to the present invention having the advantages mentioned above can be manufactured easily without drastically altering a conventional manufacturing method of the same. An alteration to be performed is merely that a birefringent medium is inclined at a time of a dry etching process. Accordingly, such useful polarization diffraction gratings can be obtained easily in a mass-production manner at low costs. Furthermore, in the manufacturing method according to the present invention, it is also possible to easily achieve a manufacture of a polarization diffraction grating according to the present invention in which the Bragg angle at which the +1-th diffraction efficiency becomes maximum occurs in occasion of perpendicular beam incidence easily.

Further, according to the present invention especially in the sixth embodiment, by applying an organic drawn film as the birefringent medium of the diffraction grating, the polarization diffraction grating can also be applied for an optical head device for a blue wavelength, and also, a manufacture of a grating having a finely reduced pitch can be easily achieved. Also, thereby, a manufacture of a grating with grooves each extending obliquely in depth can be easily achieved. Furthermore, the cost required for obtaining the material per unit area can be effectively reduced in the diffraction grating, and, thus, the polarization diffraction grating itself can be manufactured at a low cost in a mass-production manner Further, according to the present invention especially in any of the seventh through tenth embodiments, by applying the polarization diffraction grating according to any of the above-mentioned embodiments of the present invention to an optical head device for an optical disk drive, the diffraction grating can be disposed near the light source, and, thus, when the configuration of light source and light detecting device is miniaturized, adverse effect caused by a volume property which occurs due to reduction in grating pitch in the diffraction grating needed for the miniaturization of a whole unit thereof can be effectively reduced. Accordingly, occurrence of useless offset in the tracking-servo signal can be effectively reduced, and, thus, the signal detection efficiency in the optical head device can be improved. Especially, by applying the polarization diffraction grating according to the above-mentioned third or fourth embodiment, occurrence of such a useless offset can be effectively avoided, and, thus, the signal detection efficiency can be further improved.

Eleventh through thirteenth embodiments of the present invention will now be described. Each of these embodiments is a semiconductor laser unit which may be applied as the above-mentioned configuration including the light source 8, light detection device 9 and diffraction grating 7 according to any of the above-mentioned embodiments of the present invention described with reference to FIGS. 4 through 14, for example.

Figure 15:
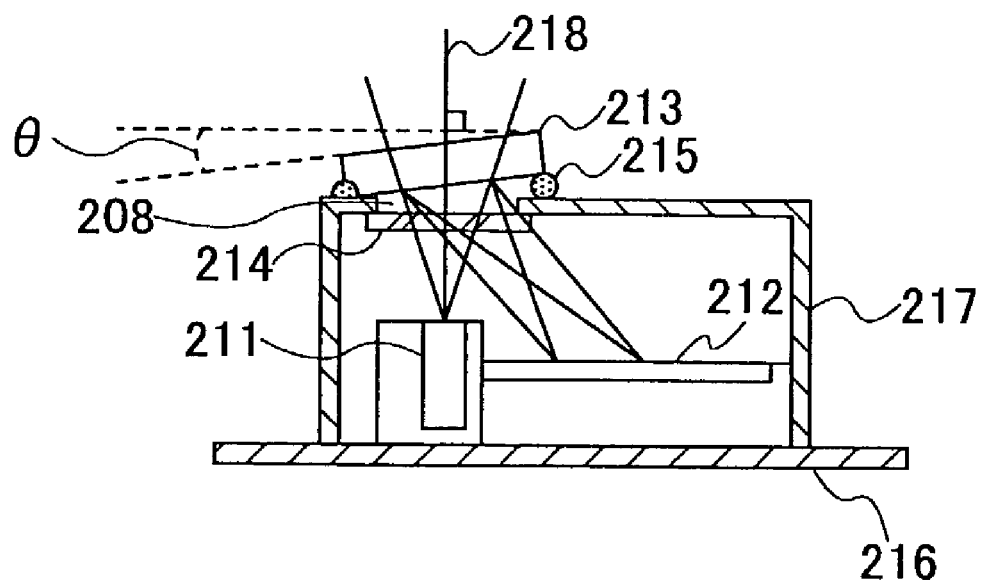
FIG. 15 illustrates a side elevational sectional view of a semiconductor laser unit in an eleventh embodiment of the present invention.

FIG. 15 shows a configuration of a semiconductor laser unit according to the eleventh embodiment of the present invention. As shown, this semiconductor laser unit includes a semiconductor laser light source 211 which emits a laser beam to be applied to a pit formed on an optical information recording medium, such as a CD, a DVD or so, a light-receiving device 212 which carries out photoelectric conversion of a returning beam reflected by the optical information recording medium, and a polarization hologram device 213 which carries out polarization beam splitting of the going laser beam emitted from the semiconductor laser light source and the returning beam from the optical recording medium.

A cover glass 214 is provided on an opening 208 formed in a cap 217 in order to prevent dirt's/dusts etc. from entering the cap 217. Further, as shown, adhesives pieces 215 are provided to fix the polarization hologram device 213 to the cap 217. A stem 216 holds the above-mentioned semiconductor laser light source and the light-receiving device thereon. The cap 217 protects the semiconductor laser light source 211 and the light-receiving element 212 held by the stem 216.

The semiconductor laser light source 211 and the light-receiving element 212 are disposed in a row in the cap 217, the opening 208 of the cap 217 is positioned so that the laser beam emitted by the semiconductor laser light source 211 passes therethrough, and the surface of the opening 208 is set perpendicular to the chief ray 218 of the beam emitted from the laser light source 211 or to the optical axis 218 of the laser light source 211. The polarization hologram device 213 is disposed in such a manner that it is inclined by a predetermined angle θ (approximately two degrees), as shown, with respect to the surface of the opening 208. The semiconductor laser 211 is made of a laser diode (LD) of a wavelength of 660 nm, and the light-receiving device 212 employs a Si photo-diode.

Figure 18:
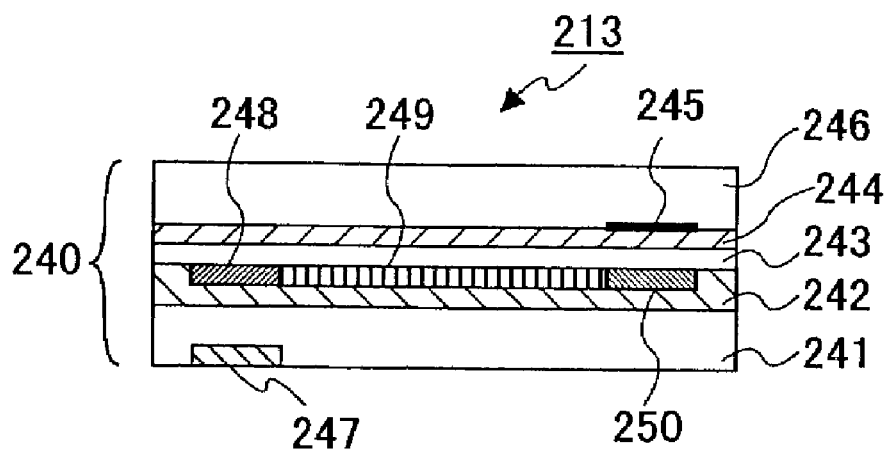
FIG. 18 illustrates a magnified side elevational sectional view of a polarization hologram device according-to the present invention.

A configuration of the polarization hologram device 213 applied there is shown in FIG. 18. An adhesion layer of an acrylic ultraviolet cure adhesive is placed on a BK7 substrate 241, and, then, an organic birefringent film 242 produced by drawing a polyester organic material is formed thereon. Thus, a substrate is prepared. Then, thereon, rectangular diffraction gratings 248, 249, and 250 are formed, and after that, an overcoat layer 243 of an epoxy ultraviolet cure resin is provided thereon in such a manner that the grating gaps of these gratings 248, 249 and 250 should be filled off with the material thereof. After that, an optically transparent isotropic substrate 246 is laminated thereon, which substrate 246 is a BK7 substrate on which a λ/4-plate 244 is previously formed.

Moreover, a reflection-prevention layer effective to a wavelength of a light to be applied thereon is prepared in the interface with the air of this BK7 substrate 246. The above-mentioned rectangular diffraction grating 249 is prepared for detecting a signal from the optical disk, and is a polarization hologram device for detecting a tracking-servo signal and a focus-servo signal.

The rectangular diffraction grating 250 reflects a part of an output beam of the semiconductor laser light source 211 directly toward the light-receiving device 212, is a polarization hologram device acting as an output monitor for the laser light source 211. A reflective film 245 of aluminum is formed just above the diffraction grating 250, as shown. The rectangular diffraction grating 248 is a polarization hologram device for detecting a tilt of the optical disc as the optical recording medium, and detects the tilt utilizing a part of the output beam of the semiconductor laser 211 together with a diffraction grating 247 of a glass provided just below of the diffraction grating 250, as shown.

The pitch of each of the diffraction gratings 248, 249 and 250 is set as approximately 2 micrometers, and the depth thereof is set as approximately 4.0 micrometers. Then, approximately 40% of efficiency is acquired in diffraction efficiency thereof.

With reference to FIGS. 15 and 18, a case will now be described where the present invention in the eleventh embodiment is employed in an optical pickup as an optical head device. A laser beam emitted from the semiconductor laser 211 passes through the cover glass 214 and the polarization hologram device 249, and after that, it exits this unit 217. At this time, the laser beam is transformed into a circular polarization state thanks to the effect of the λ/4 plate 244 integrally included in the polarization hologram as mentioned above. Furthermore, the laser beam exiting from the unit passes through several optical parts/components, such as a collimator lens or so not shown, and is applied to an optical disk loaded.

Then, a laser beam reflected by the optical disk which carries signal information is applied to the unit again. Then, it passes through the λ/4 plate 244 again, by which it is transformed into a light of a linear polarization rotated by 90 degrees from the light which has been once exiting therefrom as mentioned above, and, then, undergoes diffraction by the polarization hologram device 249. The laser beam which has thus undergone the diffraction is thereby directed to the light-receiving device 212, and therefrom, the signal written in the optical disk is read out.

On the other hand, the laser beam which has once passed through the polarization hologram device 250 is also used for monitoring the output of the semiconductor laser. In fact, it is then reflected by the reflective film 245 shown in FIG. 18 and is directed toward the light-receiving device 212. After passing through the λ/4 plate 244 twice, the laser light reflected by the reflective film 245 is diffracted by the polarization hologram device 250, and then, is led to the light-receiving device 212 as mentioned above. The output of the semiconductor laser is thus controlled based on the thus-received returning light.

The laser beam which has passed through the glass-made diffraction grating 247 shown in FIG. 18 after being emitted by the semiconductor laser then passes through the polarization hologram device 248, is applied onto the optical disk, then passes through the polarization hologram device 248 again after being reflected by the optical disk, and, then, is led to the light-receiving device 212. This returned light is then used as a laser beam for detecting a tilt of the optical disk.

Figure 19:
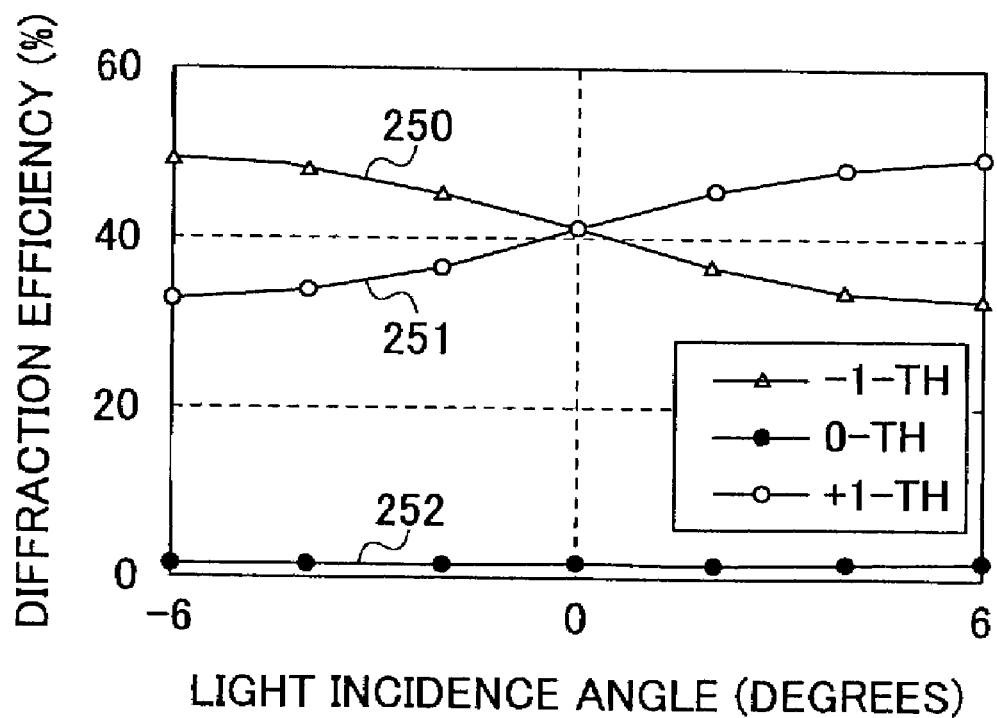
FIG. 19 illustrates a diffraction efficiency of a diffraction grating with respect to an inclination angle of an incident light onto the same.

FIG. 19 shows the diffraction efficiency of the above-mentioned polarization hologram device with respect to the incident angle of the incident light. In this graph, the vertical axis expresses the diffraction efficiency (%) of the polarization hologram device while the horizontal axis expresses the degree of light incidence angle (degrees). According to this, the efficiency of +1-th diffracted light can be improved from 40% to 45% by inclining the incident angle of incident light by 2 degrees, for example.

According to the eleventh embodiment of the present invention, the polarization hologram device 213 is disposed obliquely with respect to the optical axis 218 of the semiconductor laser as shown in FIG. 15, and the same is fixed to the cap in this position. Thereby, the diffraction efficiency is improved, according to the incident-light-angle-dependency of diffraction efficiency shown in FIG. 19, and the light-receiving efficiency of the semiconductor laser unit also is improved.

Moreover, in this embodiment, the diffraction grating having the polarization property is employed. This diffraction grating thus has a configuration in which the birefringent film 242 having a diffraction grating configuration formed therein is provided on the optically transparent substrate 241, and the material for which the refractive index is controlled is used to fill up the gaps of the diffraction grating configuration. The birefringent film 242 is made of the organic substance, and is provided with the birefringent feature as a result of being drawn. Thereby, the semiconductor laser unit in the present embodiment can be improved in its light-receiving efficiency and also, the costs thereof can be effectively reduced.

As shown in FIG. 19, the diffraction efficiency of the polarization hologram device increases as the light incidence angle thereto is increased. Accordingly, in the eleventh embodiment, in order to improve the light-receiving efficiency in the semiconductor laser unit, the polarization hologram device is mounted to the cap of the semiconductor laser unit obliquely with respect to the optical axis of the semiconductor laser or to the chief ray of the incident beam, with the predetermined angle θ, as mentioned above.

A specific method of providing this oblique installation of the polarization hologram device may be selected from various possible ways. For example, in the embodiment shown in FIG. 15, some insertions 215 are provided between the hologram device 213 and the cap 217 such that the predetermined inclination of the hologram device 213 is provided. Alternatively, while the polarization hologram device 213 is temporarily held in an inclined state with a predetermined angle by a certain jig or so, an adhesive may be made cured between the hologram device 213 and cap 217.

Figure 16:
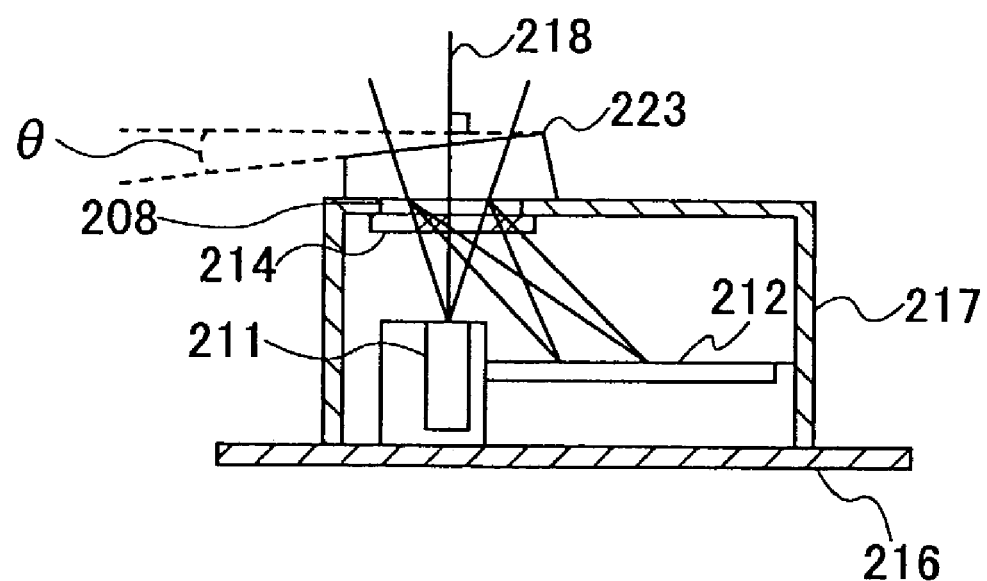
FIG. 16 illustrates a side elevational sectional view of a semiconductor laser unit in a twelfth embodiment of the present invention.

FIG. 16 shows a configuration of a semiconductor laser unit according to a twelfth embodiment of the present invention. The same reference numerals are given to the parts/components as those in the eleventh embodiment described above with reference to FIG. 15, and duplicated description will be omitted. The points in that the twelfth embodiment shown in FIG. 16 differs from the above-mentioned eleventh embodiment are those in that the polarization hologram device 223 is configured such that the surface on which a beam is applied from the inside of the laser unit is made parallel to the opening surface of the laser unit 217, while the surface of the polarization hologram device 223 at which the beam exits the laser unit 217 is inclined by a predetermined angle θ (approximately two degrees) with respect to the opening surface of the laser unit 217.

In the twelfth embodiment, the semiconductor laser 211 has the wavelength of 660 nm, and the light-receiving device 212 is made of a Si-photodiode. As the configuration of the hologram device 223 in the twelfth embodiment is the same as that in the eleventh embodiment as shown in FIG. 18, except that the portion thereof at which the device 223 is made adhere to the cap of the laser unit is made inclined by approximately two degrees (θ) as mentioned above.

Thus, according to the twelfth embodiment, for the purpose of inclining the polarization hologram device 223 with respect to a plane perpendicular to the optical axis of the semiconductor laser, the surface thereof from which the beam is emitted is inclined by the predetermined angle θ (approximately two degrees) with respect to the opening surface of the cap. Thereby, the diffraction efficiency is improved and the light-receiving efficiency of the semiconductor laser unit also is improved as in the eleventh embodiment described above with reference to FIG. 15.

Moreover, also in this embodiment, the diffraction grating having the polarization property is employed. This diffraction grating has a configuration in which the birefringent film 242 having the diffraction grating formed therein is formed on the optically transparent substrate 241, and the material for which the refractive index is controlled is used to fill up the grating gaps of the diffraction grating. The birefringent film 242 is made of the organic substance, and is provided with the birefringent feature as a result of being drawn. Thereby, the semiconductor laser unit 217 can be improved in its light-receiving efficiency and also, the costs thereof are effectively reduced, as in the eleventh embodiment.

Thus, by previously providing the inclined surface on the diffraction grating or the polarization hologram device itself at the manufacturing stage at a predetermined accuracy, no further adjustment of the inclination is required at an assembly stage in which this hologram device is mounted onto the cap of the semiconductor laser unit. Thus, as the surface of the diffraction grating or hologram device at which the same is mounted on the cap of the laser unit is inclined at the manufacturing stage with the predetermined accuracy, the high accuracy is secured, and also, no complicated adjustment operation is needed at the assembly stage.

Figure 17A:
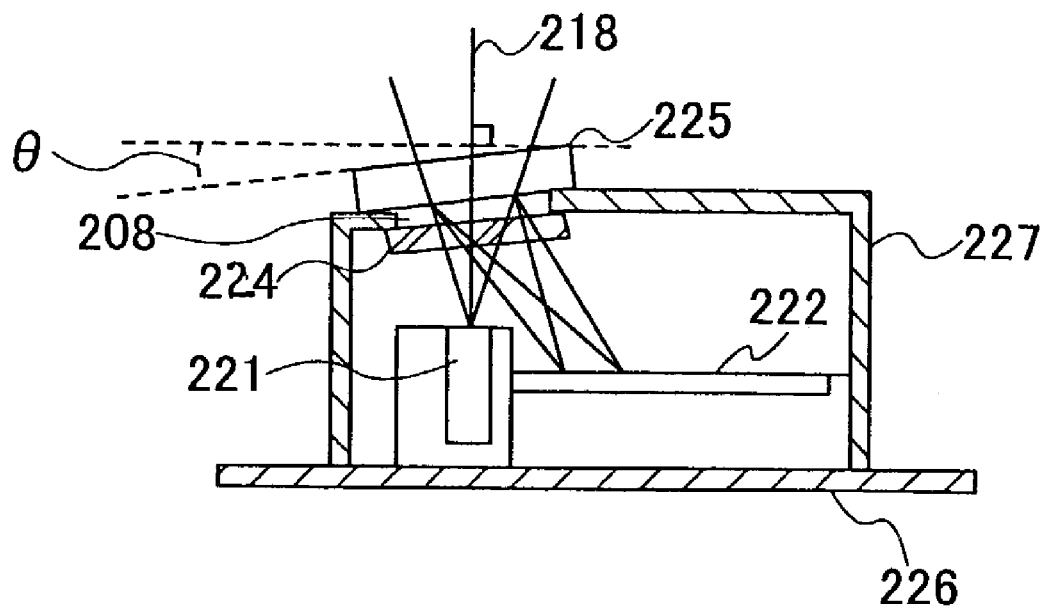
FIGS. 17A and 17B illustrate side elevational sectional views of semiconductor laser units in a thirteenth embodiment of the present invention.
Figure 17B:
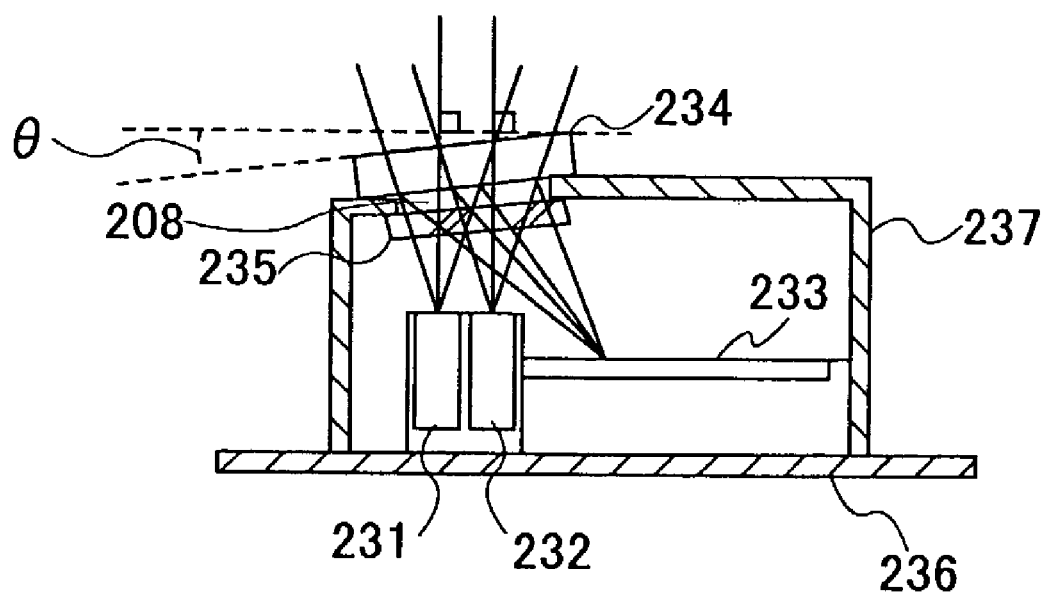

FIGS. 17A and 17B show a general configuration of a semiconductor laser unit in a thirteenth embodiment of the present invention. FIG. 17A shows a case where a single semiconductor laser is employed while FIG. 17B shows a case where two semiconductor lasers of different wavelengths are employed. A different point from the configuration shown in FIG. 15 is that the opening surface itself formed in the cap 427 is made oblique with respect to the optical axis 218 of the laser 221 (or 231/232), or with respect to the chief ray 218 of the beam emitted from the laser 221 (or 231/232), by a predetermined angle θ (approximately two degrees), and, on which the polarization hologram device 225 is fixed.

Further, as shown in the figures, a difference of the case illustrated in FIG. 17B from the configuration illustrated in FIG. 17A is that the plurality of semiconductor lasers 231 and 232 are provided simultaneously. In this case, the wavelength of the laser 231 is 660 nm while the wavelength of the laser 232 is 780 nm. The light-receiving device 222/223 is made of a Si-photodiode.

Also in this embodiment, the polarization hologram device 225/234 applied is same as that described above with reference to FIG. 18. The rectangular diffraction grating part 249 shown in FIG. 18 is used for detecting the signal read from an optical disk loaded, and acts as a polarization hologram device for detecting a tracking-servo signal and a focus-servo signal. In the case shown in FIG. 17B, this part 249 is configured such that the diffraction gratings applicable for the respective different wavelengths are provided in a form of divided strips, for the purpose of leading the laser beams with the respective wavelengths to the light-receiving device 233.

With reference to FIG. 18, the rectangular diffraction grating part 250 reflects a part of the output beam of the semiconductor laser light source directly toward the light-receiving device, for the purpose of monitoring the output of the semiconductor laser. For this purpose, the reflective film 245 made of aluminum is provided above the part 250. The rectangle diffraction grating part 248 acts as a polarization hologram device for detecting a tilt of the optical disk loaded. Specifically, detection of the tilt is achieved by using a part of the output of the semiconductor laser in combination with the diffraction grating 247 made of a glass provided below as shown.

Each of the diffraction gratings 248, 249 and 250 has a pitch of approximately 2 micrometers, and a depth of approximately 4.0 micrometers. Each thereof has a diffraction efficiency of approximately 40% for a laser beam of 660 nm in wavelength, while the same has a diffraction efficiency of approximately 35% for a laser beam of 780 nm in wavelength.

An operation of the embodiment of the present invention shown in FIG. 17B in case it is applied to an optical pickup will now be described. A basic operation thereof is same as that of each of the eleventh and twelfth embodiments described above with reference to FIGS. 15 and 16. However, in the case of the configuration shown in FIG. 17B, same operation is performed for lights of the two different wavelengths. Further, a configuration is provided such that, on the light receiving device 233, the laser beams having the different wavelengths are made to be applied at the same area thanks to the functions of the diffraction gratings 249 described above. Thereby, it becomes not necessary to increase the number of light-receiving device or light-receiving zones on the single light-receiving device 233.

According to the present embodiment, as mentioned above, the polarization hologram device 234 is mounted in a manner of being made oblique by the angle θ with respect to a plane perpendicular to the optical axis of each laser or with respect to each of the chief rays of the laser beams of the different wavelengths, as shown in FIG. 17A. Thereby, the diffraction efficiency is effectively improved and the light-receiving efficiency of the semiconductor laser unit is improved accordingly.

Moreover, also in this embodiment, the diffraction grating having the polarization property is employed. This diffraction grating has a configuration in which the birefringent film 242 having the diffraction grating formed therein is formed on the optically transparent substrate 241, and the material for which the refractive index is controlled is used to fill up the grating gaps of the diffraction grating. The birefringent film 242 is made of the organic substance, and is provided with the birefringent feature as a result of being drawn. Thereby, the semiconductor laser unit can be improved in its light-receiving efficiency and also, the costs thereof are effectively reduced.

The above-mentioned cap 227/237 is manufactured with a molding die in general. In this case, for the purpose of providing a predetermined inclination in the opening surface of the cap at which the hologram device 225/234 is mounted, the predetermined inclination is provided in the molding die at the portion corresponding to the above-mentioned opening surface.

Furthermore, in the configuration shown in FIG. 17B, the plurality of semiconductor lasers 231 and 232 having the different wavelengths are provided at once, and, the polarization hologram device 234 is configured such that the beams of the different wavelengths are made to be applied to the same area of the light-receiving device 233. Further, by thus providing the plurality of functions of the diffraction gratings as mentioned above, the semiconductor laser unit can have many functions to perform with the single unit.

As well-known, generally speaking, there are two types of optical pickups, i.e., an optical pickup for a CD system applying a wavelength of 780 nm and another optical pickup for a DVD system applying a wavelength of 660 nm. For the purpose of reading information from these two types of recording media, respective two different laser light sources having the corresponding respective wavelengths should be applied. Then, according to the embodiment of the present invention described above with reference to FIG. 17B, as these two types of laser light sources 235 and 234 are held by the single cap 237, the semiconductor laser unit can thus be used for handling any of both the different types of recording media with an effectively miniaturized size, and an effectively reduced cost.

Furthermore, in such a configuration, if lights of these plurality of different wavelengths were incident on respective different positions after reflected by the optical disk loaded, a plurality of light-receiving devices would be needed accordingly. However, according to the embodiment shown in FIG. 17B, the diffraction grating 249 is configured such that the reflected lights of different wavelengths are incident at the same position of the light-receiving device 233 as mentioned above. Thereby, the number of light-receiving devices should not be increased nor the area of the light receiving should be enlarged. Thus, the semiconductor laser unit can be miniaturized and also, the costs therefor can be reduced accordingly.

Also in each of the above-mentioned eleventh and twelfth embodiments shown in FIGS. 15 and 16, two semiconductor lasers having respective different wavelengths may be applied as in the configuration described above with reference to FIG. 17A.

Thus, according to the present invention especially concerning the above-mentioned eleventh through thirteenth embodiments described above with reference to FIGS. 15 through 19, as the polarization hologram device is disposed obliquely with respect to the optical axis of the laser at a predetermined angle not at the right angle, the diffraction efficiency applied can be effectively improved, and, thus, the light-receiving efficiency of the semiconductor laser unit can be effectively improved.

For this propose, by inclining the beam exiting surface of the diffraction grating at a manufacturing stage by a predetermined angle as shown in FIG. 16, the accuracy of the inclination can be ensured at a high level, and, thus, an adjustment work may be omitted at an assembly stage. Accordingly, the manufacturing process can be simplified.

Alternatively, by providing an inclination for a predetermined angle in the opening surface in the cap on which the diffraction grating is fixed, as shown in FIG. 17A/17B, the inclination angle is determined by the shape of the cap. Accordingly, the assembly costs can also be effectively reduced.

Further, by providing a two type of laser light sources having respective different wavelengths in the single cap as shown in FIG. 17B, the semiconductor laser unit for the respective two different optical disk systems can be effectively miniaturized and also, effective cost saving can be achieved.

In this connection, by configuring the diffraction grating such as to focus the beams of the different wavelengths at the same area of the light-receiving device, the light-receiving device can be effectively miniaturized, and, also, the costs therefor
can be effectively reduced Further, as the diffraction grating is disposed in a manner of being inclined in a direction opposite to the direction in which the light-receiving device is disposed, the diffraction efficiency can be improved, and, thus, the light-receiving efficiency of the semiconductor laser unit can be further improved. In fact, the direction in which the diffraction grating is inclined should be such that the reflected beam from the optical disk should be received by the light-receiving device with an area wider as possible. For this purpose, in a condition in which the semiconductor laser and light-receiving device are disposed side by side on a common plane, the diffraction grating should be inclined in a direction opposite to the direction of the light-receiving device. Thereby, as mentioned above, the diffraction efficiency can be improved, and, thereby, the light-receiving efficacy of the semiconductor laser unit can be improved.

Further, as the diffraction grating has the polarization property as mentioned above, the common diffraction grating can be used to separate lights. In fact, a beam emitted from the laser is transformed into a light of a circular polarization, and then, after it is reflected by the recording medium or optical disk, the reflected light is transformed into a light of a linear polarization at this time. By this effect, the common diffraction grating can be used for separating these going light and returning light in there beam paths. Thus, for the purpose of separating the going light and returning light, the diffraction grating having the polarization property is advantageous.

Furthermore, as the λ/4 plate is integrated into the polarization hologram in a form of a lamination as shown in FIG. 18, the optical system which provides the polarization function can be effectively miniaturized. By the λ/4 plate, the laser beam is transformed into a light of a circular polarization. After that, the beam exiting from the laser unit passes through the collimator lens, and, then, is applied to the optical disk. A light then reflected by the optical disk and thus carrying signal information is again incident on the laser unit. At this time, the beam is again made to pass through the λ/4 plate. Thereby, the incident light is transformed into a light of a linear polarization which is rotated 90 degrees with respect to the going light. Accordingly, the thus-transformed light is diffracted by the polarization hologram device. As a result, it is led into the light-receiving device, and, thus, the signal information written in the optical disk can be read out. Thus, according to the present invention, as the λ/4 plate is integrated with the polarization hologram in a form of a lamination, the optical system having the polarization function can be achieved with an effectively reduced size.

Further, as the inclination angle at which the diffraction grating is mounted on the cap is determined in a range between 2 through 6 degrees, the diffraction efficiency can be effectively improved. As shown in FIG. 19, the diffraction efficiencies for +1-th diffraction and −1-th diffraction in the diffraction grating vary as the angle of an incidence beam is changed in plus/minus directions with respect to 0 degrees. At this time, as shown, the diffraction efficiency increases in a range between 2 and 6 degrees in the angle of incident beam. Therefore, when the inclination angle of the diffraction grating is selected within this range, the diffraction efficiency obtained can be improved effectively.

Further, the present invention is not limited to the above-described embodiments, and variations and modifications may be made without departing from the basic concepts of the present invention.

The present application is based on Japanese priority applications Nos. 2002-117861, 2002-171427, 2002-245199 and 2002-118445, filed on Apr. 19, 2002, Jun. 12, 2002, Aug. 26, 2002 and Apr. 19, 2002, respectively, the entire contents of which are hereby incorporated by reference.

What is claimed is:

1. A device, comprising:
  a polarization diffraction grating including two media having different molecular orientation states arranged alternately and periodically,
  wherein each boundary between the media forms an oblique parallelogram shape.

2. A polarization diffraction grating comprising:
  two media having different molecular orientation states arranged alternately and periodically,
  wherein each boundary between the media forms an oblique parallelogram shape, and
  wherein one of said two media has a birefringent property, and the other has an isotropy.

3. The polarization diffraction grating as claimed in claim 2, wherein one of two refraction indexes along respective different directions in one plane of said medium having birefringent property is approximately equal to a refraction index of the medium having isotropy.

4. The polarization diffraction grating as claimed in claim 2, wherein the medium having birefringent property has a grating configuration with a surface relief shape, and concave portion of the surface relief shape of the media having birefringent property is filled with the medium having isotropy.

5. The polarization diffraction grating as claimed in claim 1, wherein the direction of an inclination of the oblique parallelogram shape of the media is opposite to, with respect to a normal of a substrate of the grating, the direction of an inclination of a +1-th diffracted light of the diffraction grating for which the diffraction efficiency is improved.

6. A polarization diffraction grating comprising:
  two media having different molecular orientation states arranged alternately and periodically,
  wherein each boundary between the media forms an oblique parallelogram shape, and
  wherein the inclination angle β of the oblique parallelogram shape is set as approximately one half of a diffraction angle α0 in the media of the diffraction grating occurring when a light having a wavelength of λ is incident normally to the diffraction grating.

7. A polarization diffraction grating comprising:
  two media having different molecular orientation states arranged alternately and periodically,
  wherein each boundary between the media forms an oblique parallelogram shape, and
  wherein the inclination angle β of the oblique parallelogram shape is varied through the surface of the grating so that the requirement of Bragg angle is satisfied throughout the area of the grating.

8. The polarization diffraction grating as claimed in claim 1, wherein the requirements according to the following formula are satisfied:

Q<2, where:

$Q=2\pi\lambda T/nd^2$;

λ denotes a wavelength of a light applied in the air;
T denotes a depth of the grating;
n denotes the refractive index of any of the media in the diffraction grating; and
d denotes the pitch of the grating.

9. The polarization diffraction grating as claimed in claim 2, wherein:
the medium having birefringent property has a surface relief grating configuration; and
in a manufacture stage of the medium having birefringent property, a dry etching way employing one of ion and plasma is applied to form the surface relief shape in the medium having birefringent property, and during the dry etching process, the medium having birefringent property is inclined with respect to an etching electrode.

10. The polarization diffraction grating as claimed in claim 9, wherein the inclination angle by which the medium having birefringent property with respect to the etching electrode is set as being approximately one half of a required diffraction angle α0 in the media of the diffraction grating to occur when a light is incident normally to the diffraction grating.

11. The polarization diffraction grating as claimed in claim 2, wherein an organic stretched film is used as the medium having birefringent property.

12. An optical head device comprising:
a light source;
a coupling lens which couples a light from said light source;
a converging lens which converges the light from said coupling lens onto an optical recording medium; and
an optical system in which a diffraction grating and a ¼-wave plate are disposed on a light path, a light reflected from the optical recording medium is separated through said diffraction grating, and the thus-separated light is received by a photo detector,
wherein a polarization diffraction grating is applied as the diffraction grating in said optical system, and wherein said polarization diffraction grating includes two media having different molecular orientation states arranged alternately and periodically, wherein each boundary between the media forms an oblique parallelogram shape.

13. The optical head device as claimed in claim 12, wherein said light source, said photo detector and said diffraction grating are integrally combined.

14. An optical head device comprising:
a plurality of light sources;
a coupling lens which couples a light from any of said plurality of light sources;
a converging lens which converges the light from said coupling lens onto an optical recording medium; and
an optical system in which a diffraction grating and a ¼-wave plate are disposed on a light path, a light reflected from the optical recording medium is separated through said diffraction grating, and the thus-separated light is received by a photo detector,
wherein a polarization diffraction grating is applied as the diffraction grating in said optical system, and wherein said polarization diffraction grating includes two media having different molecular orientation states arranged alternately and periodically, wherein each boundary between the media forms an oblique parallelogram shape.

15. The optical head device as claimed in claim 14, wherein said plurality of light sources, said photo detector and said diffraction grating are integrally combined.

* * * * *